July 23, 1940.  J. W. CHALMERS ET AL  2,209,110
WRAPPING MACHINE
Filed Oct. 29, 1937  20 Sheets-Sheet 6

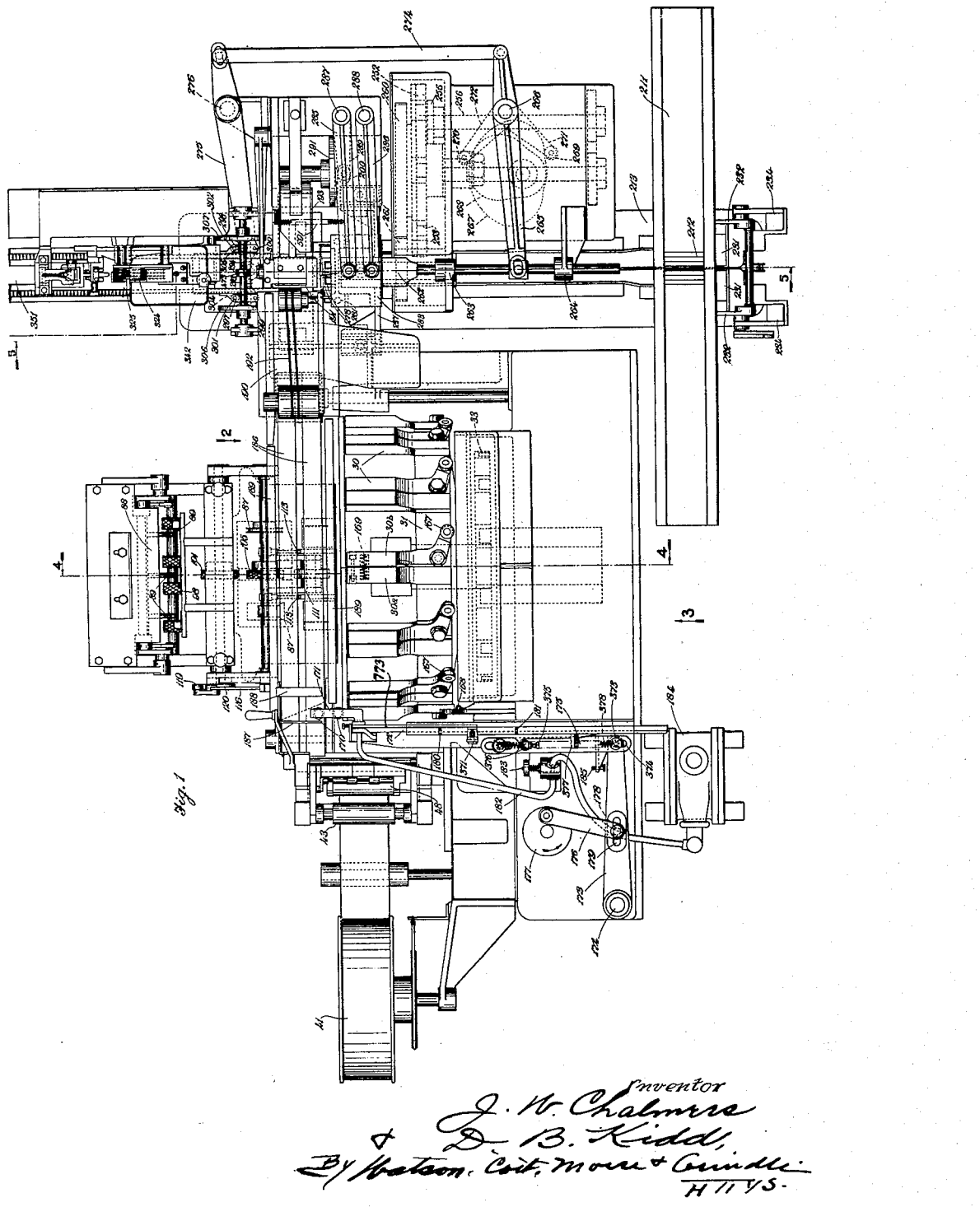

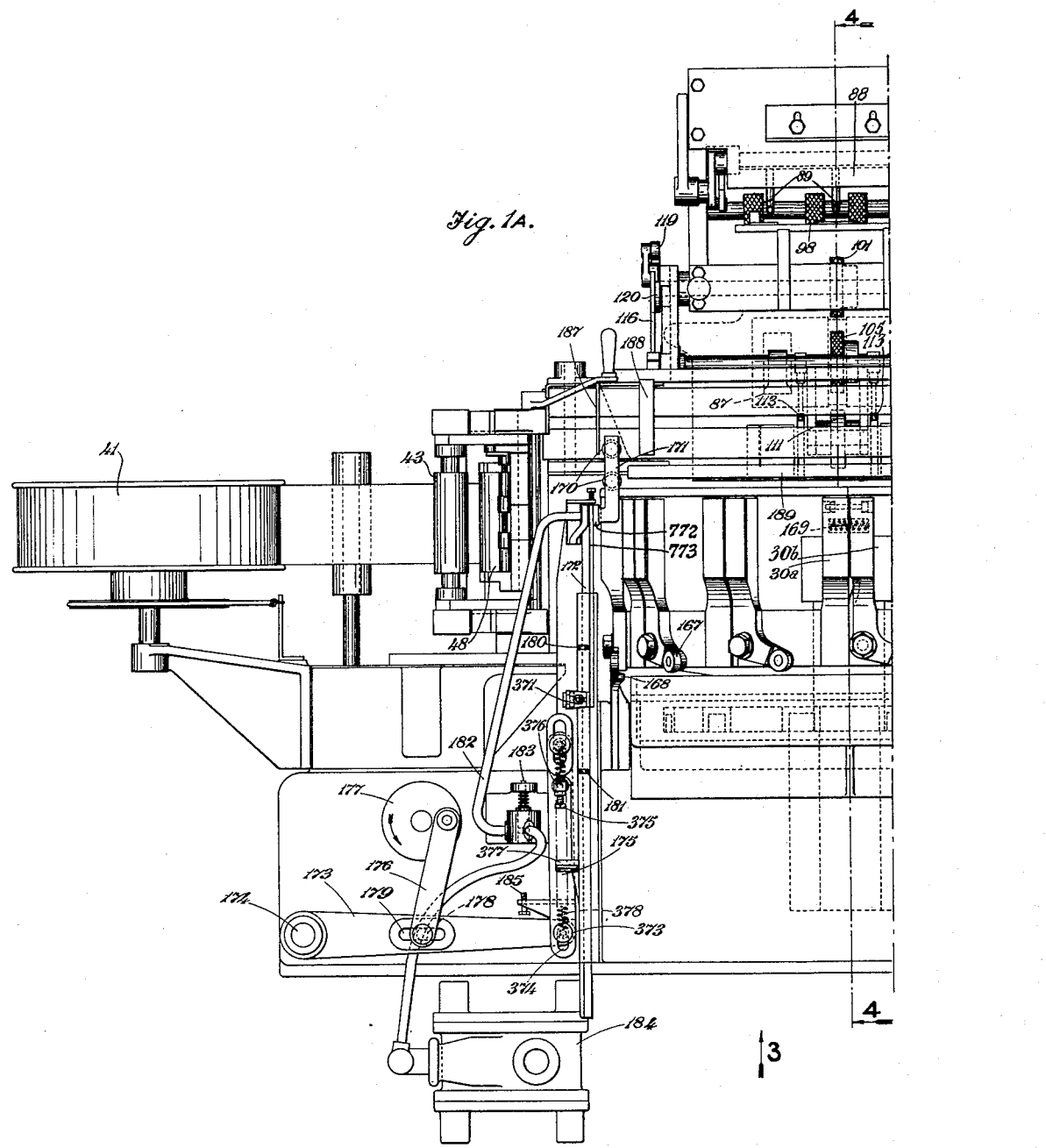

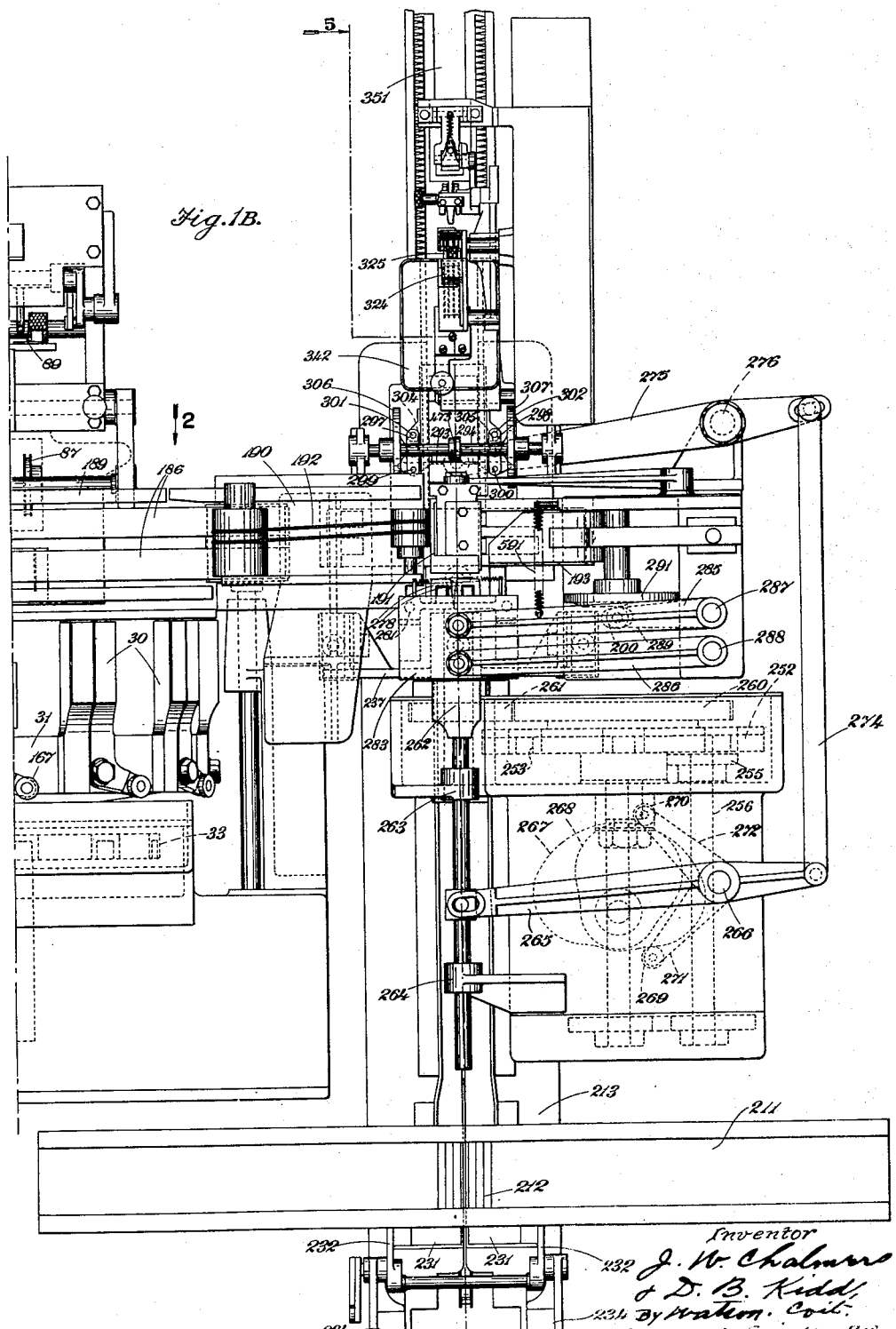

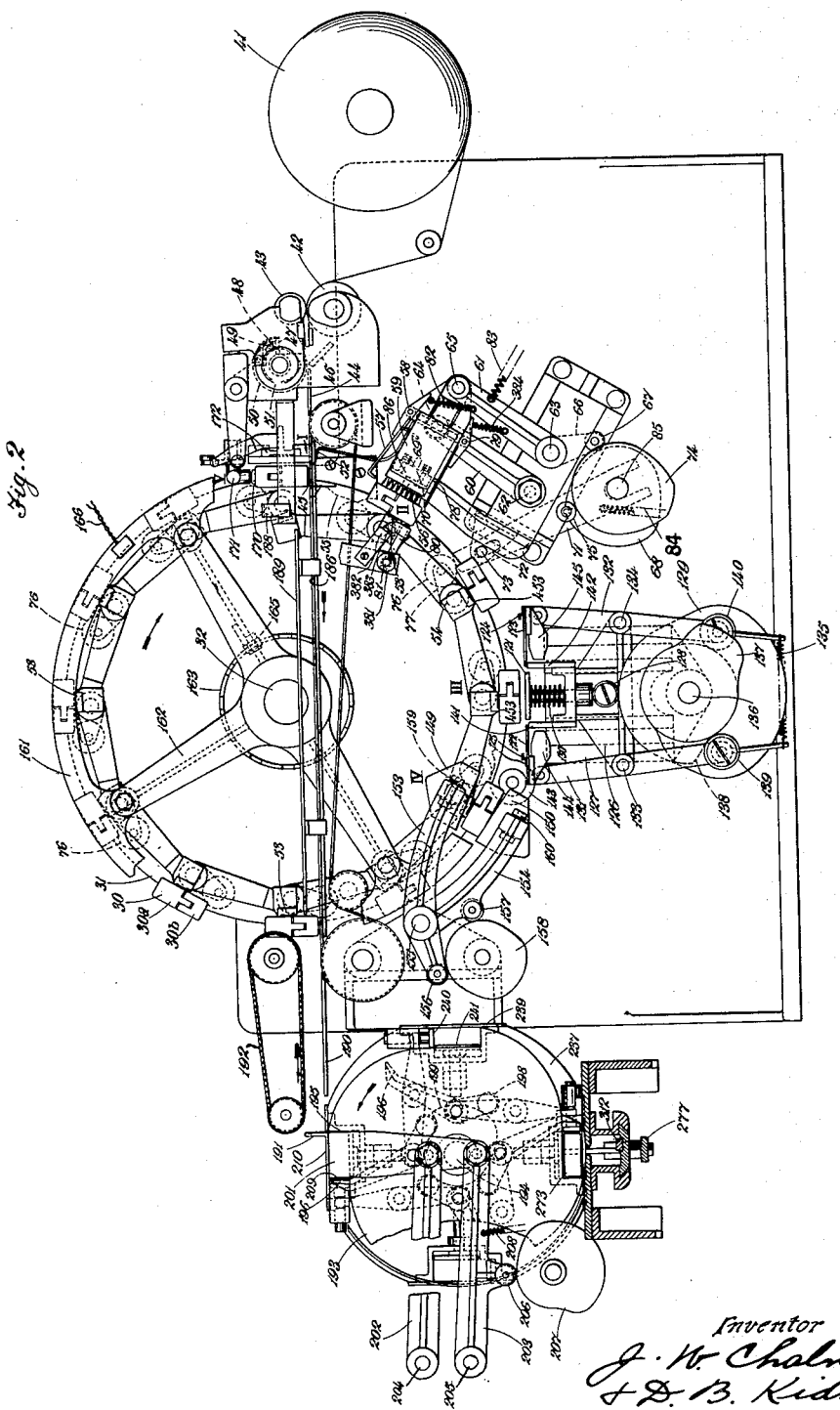

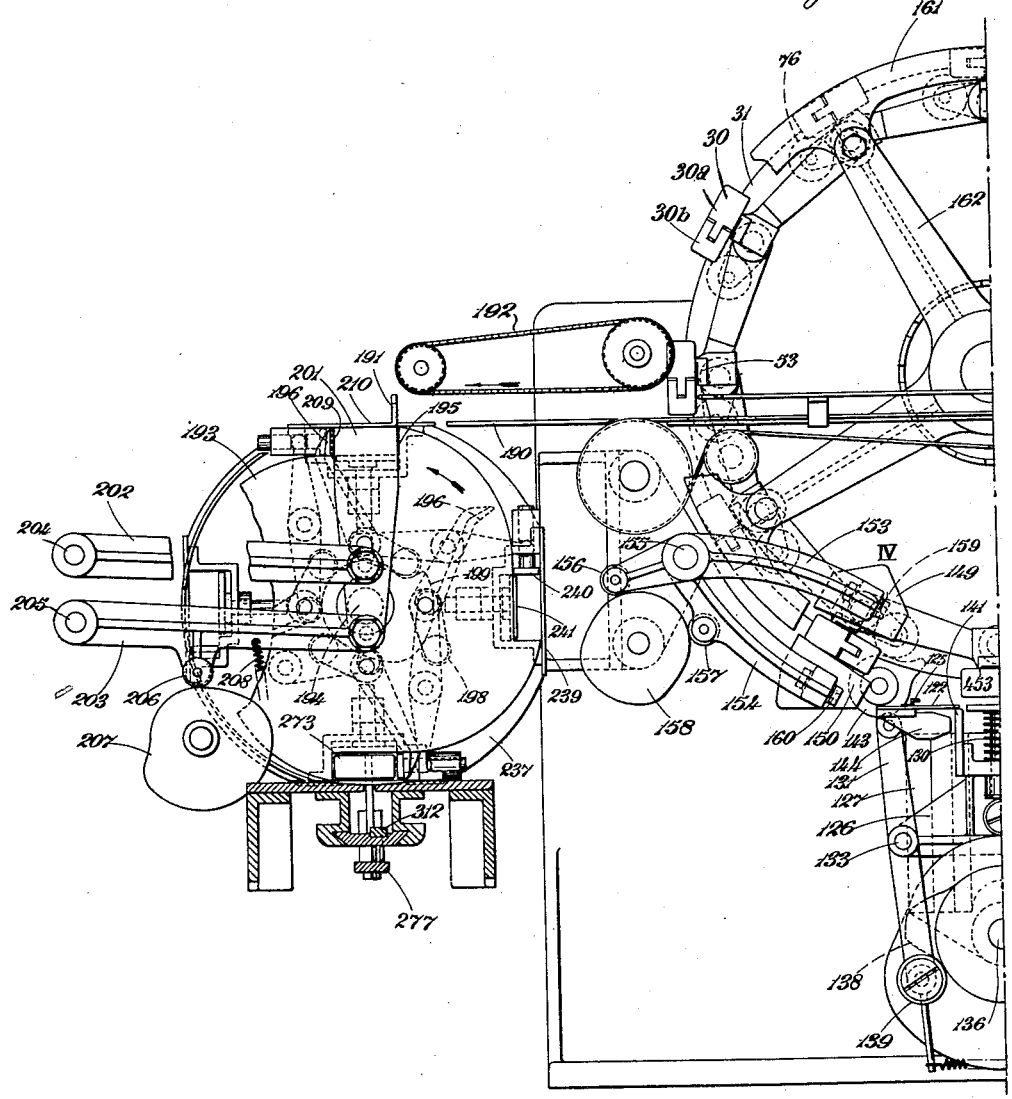

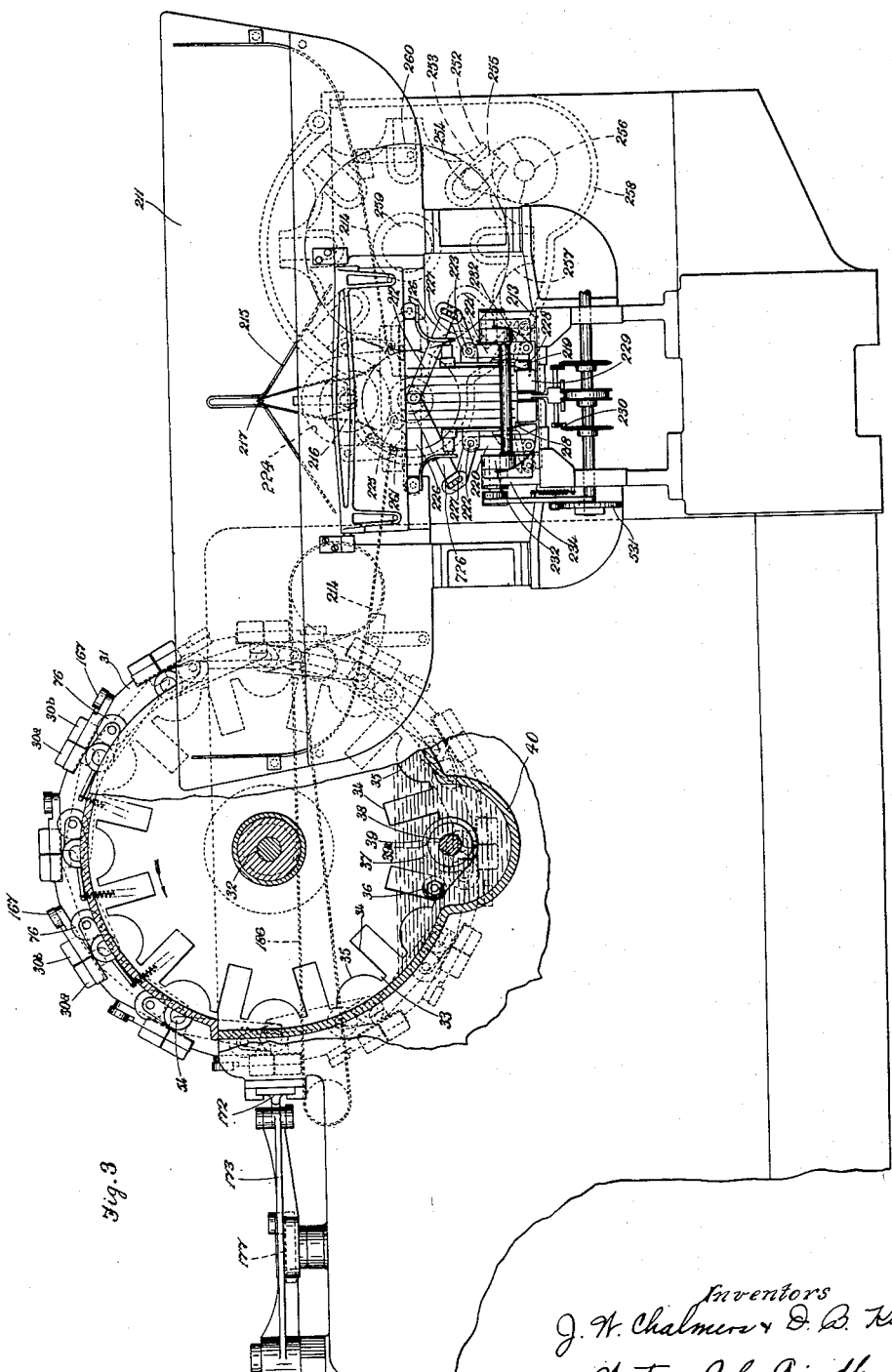

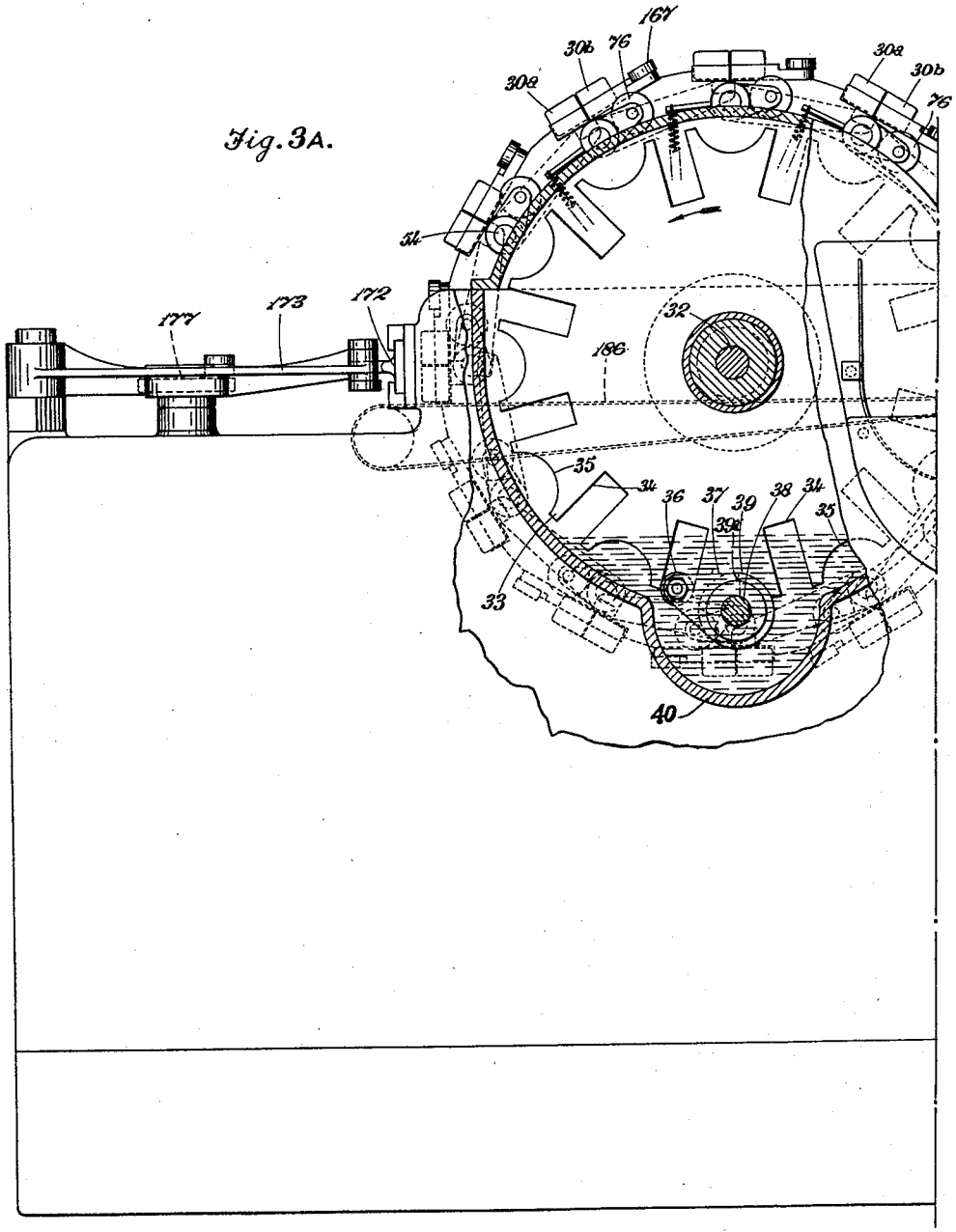

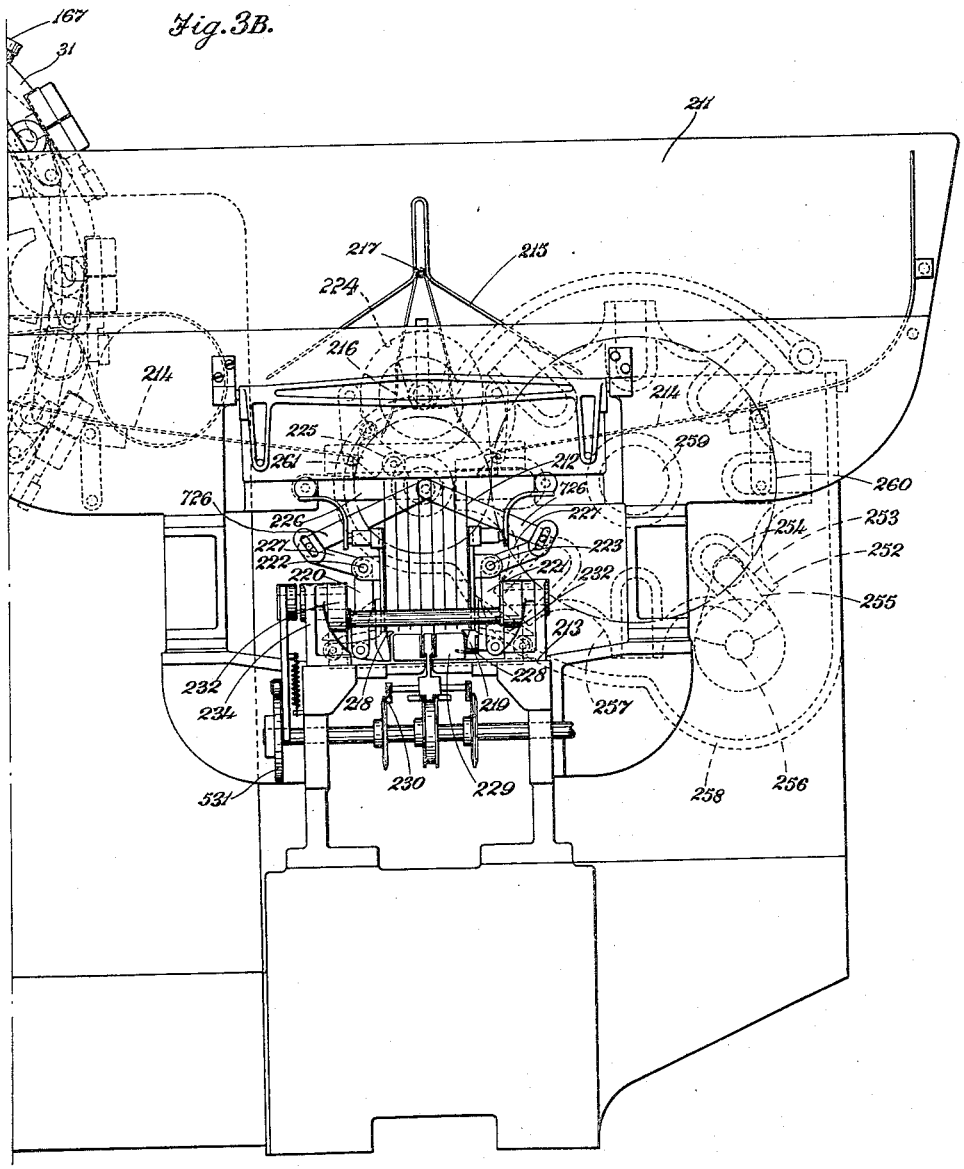

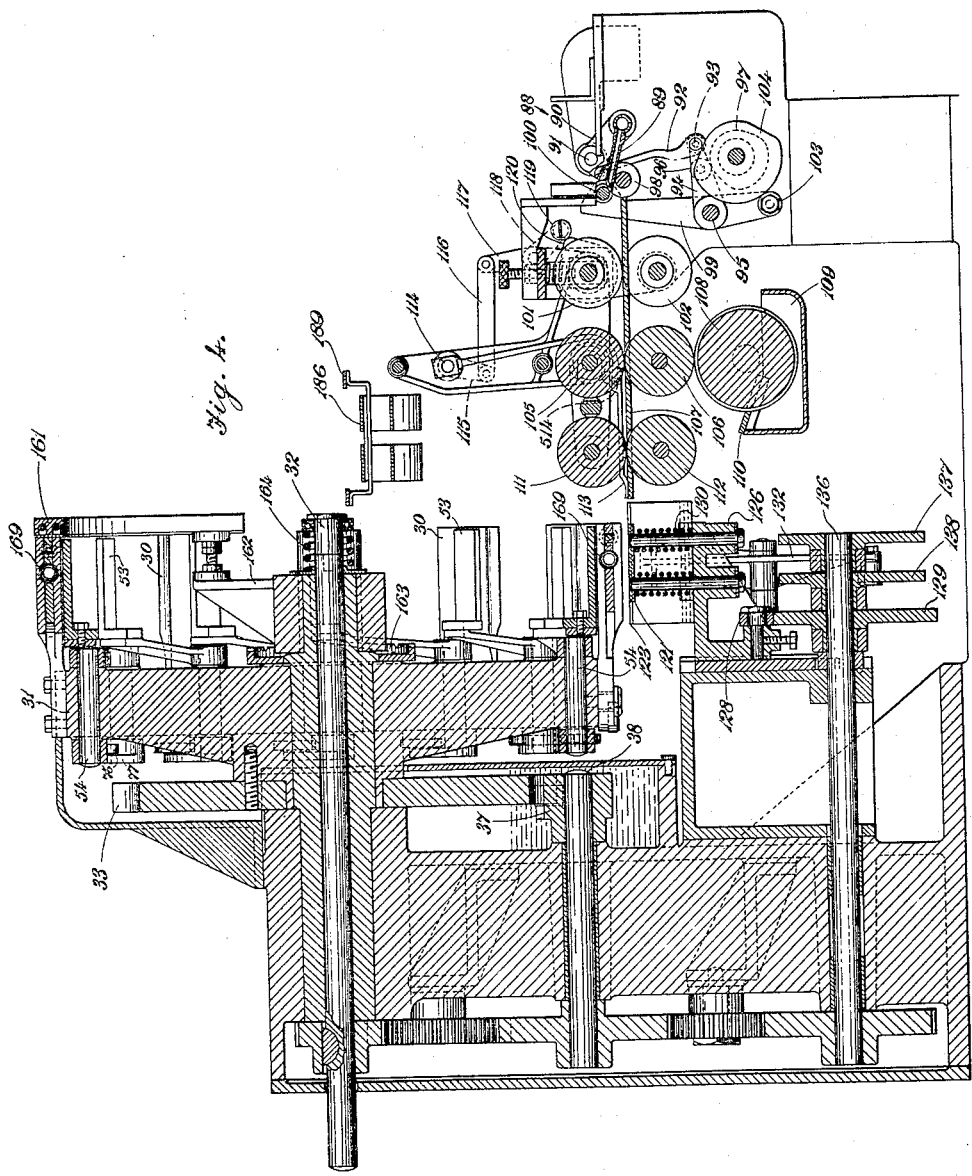

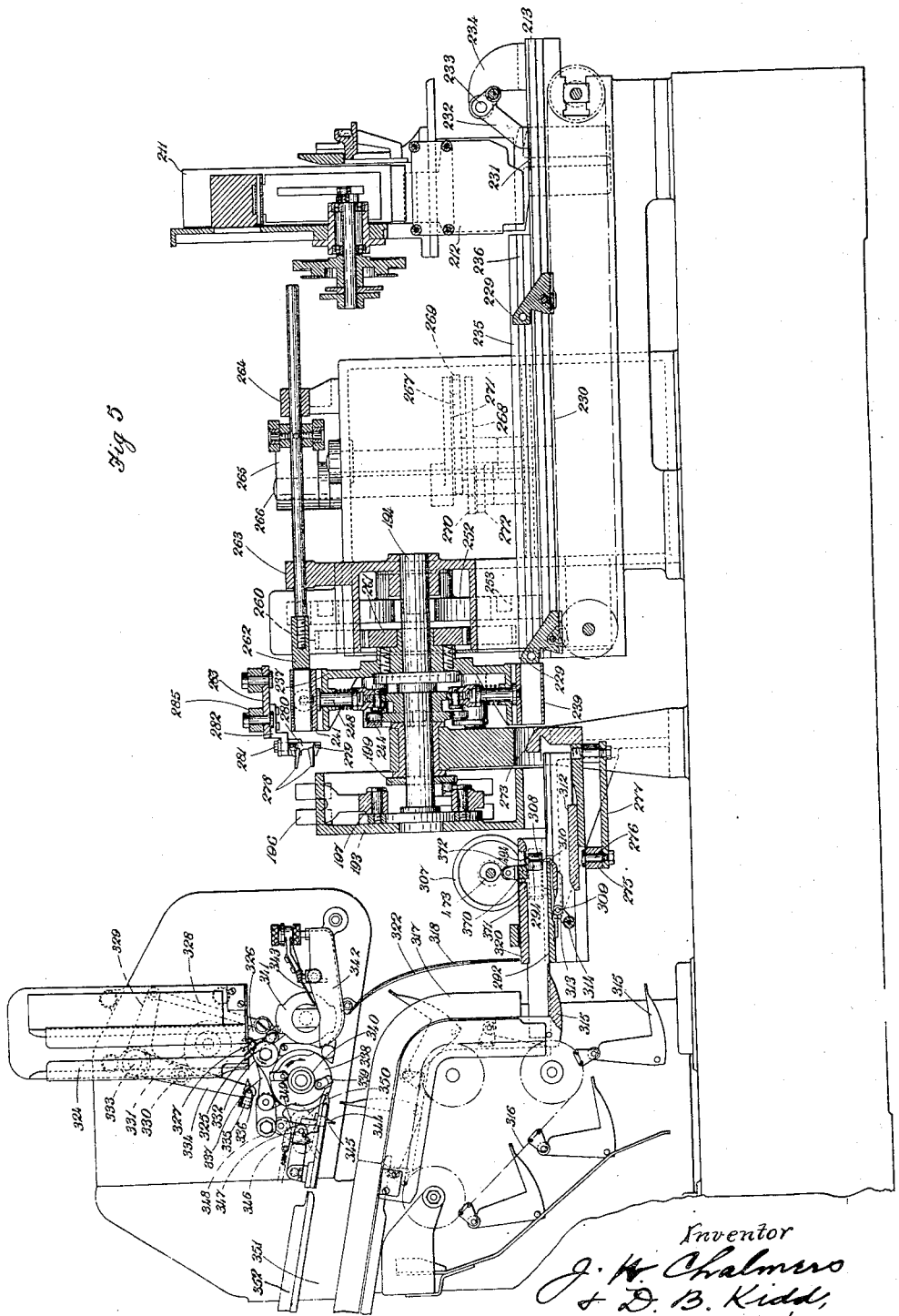

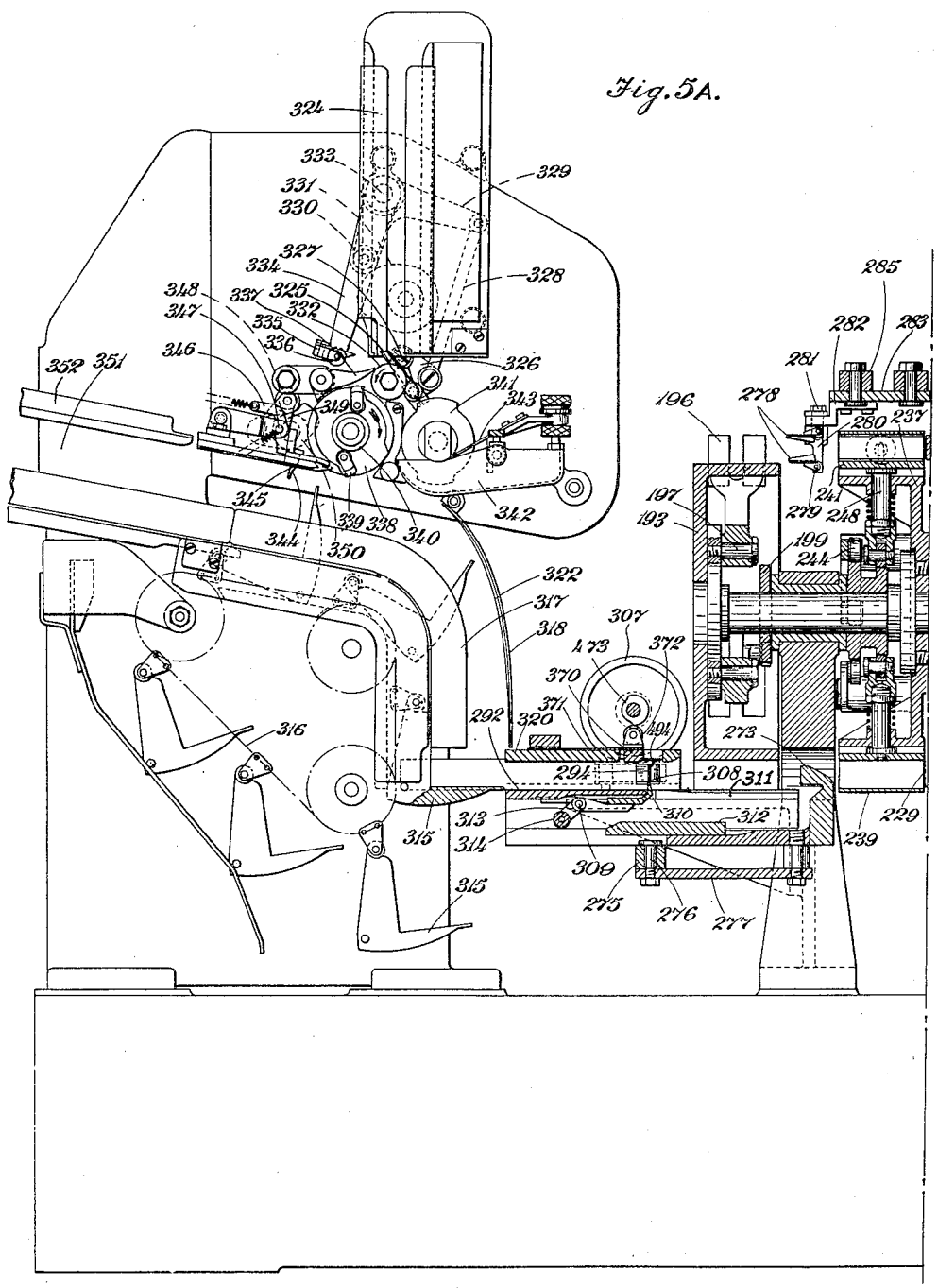

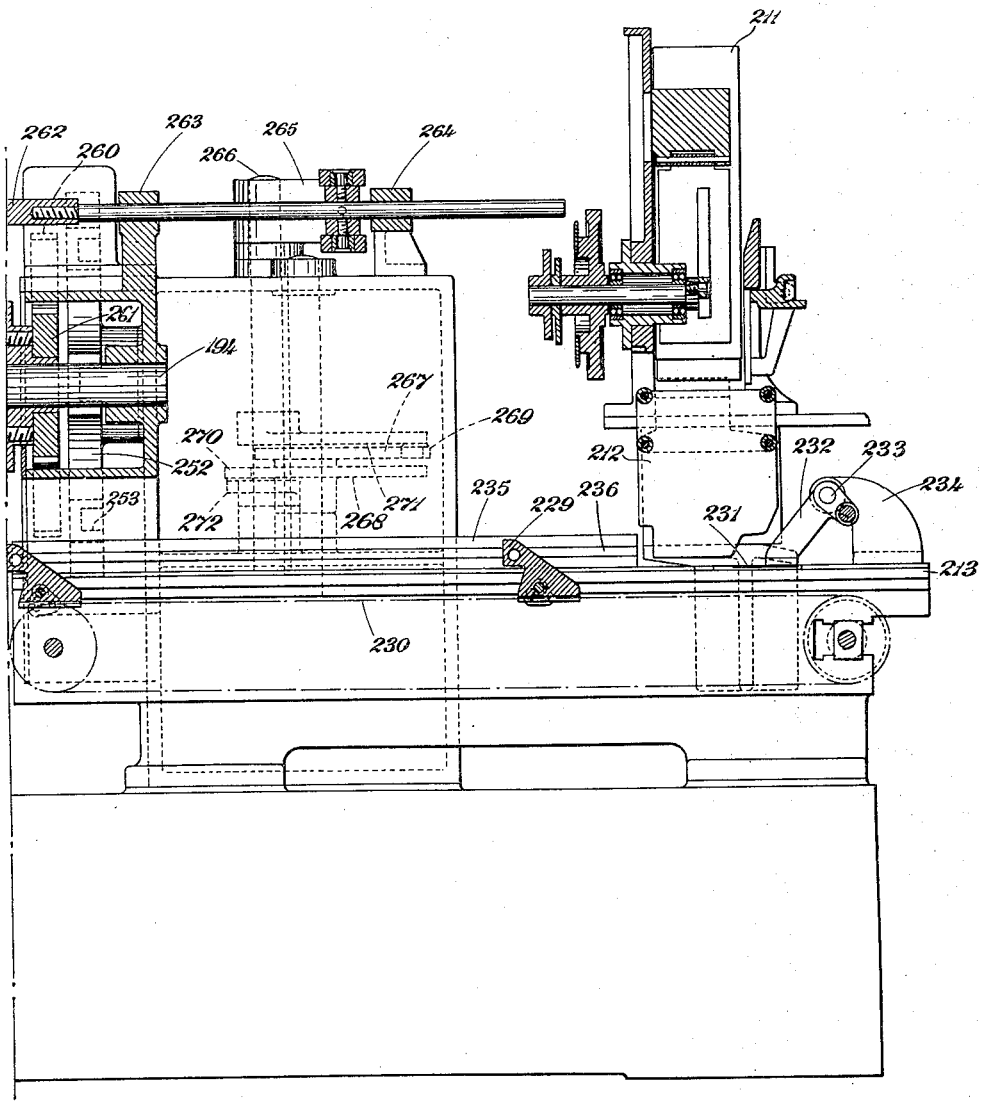

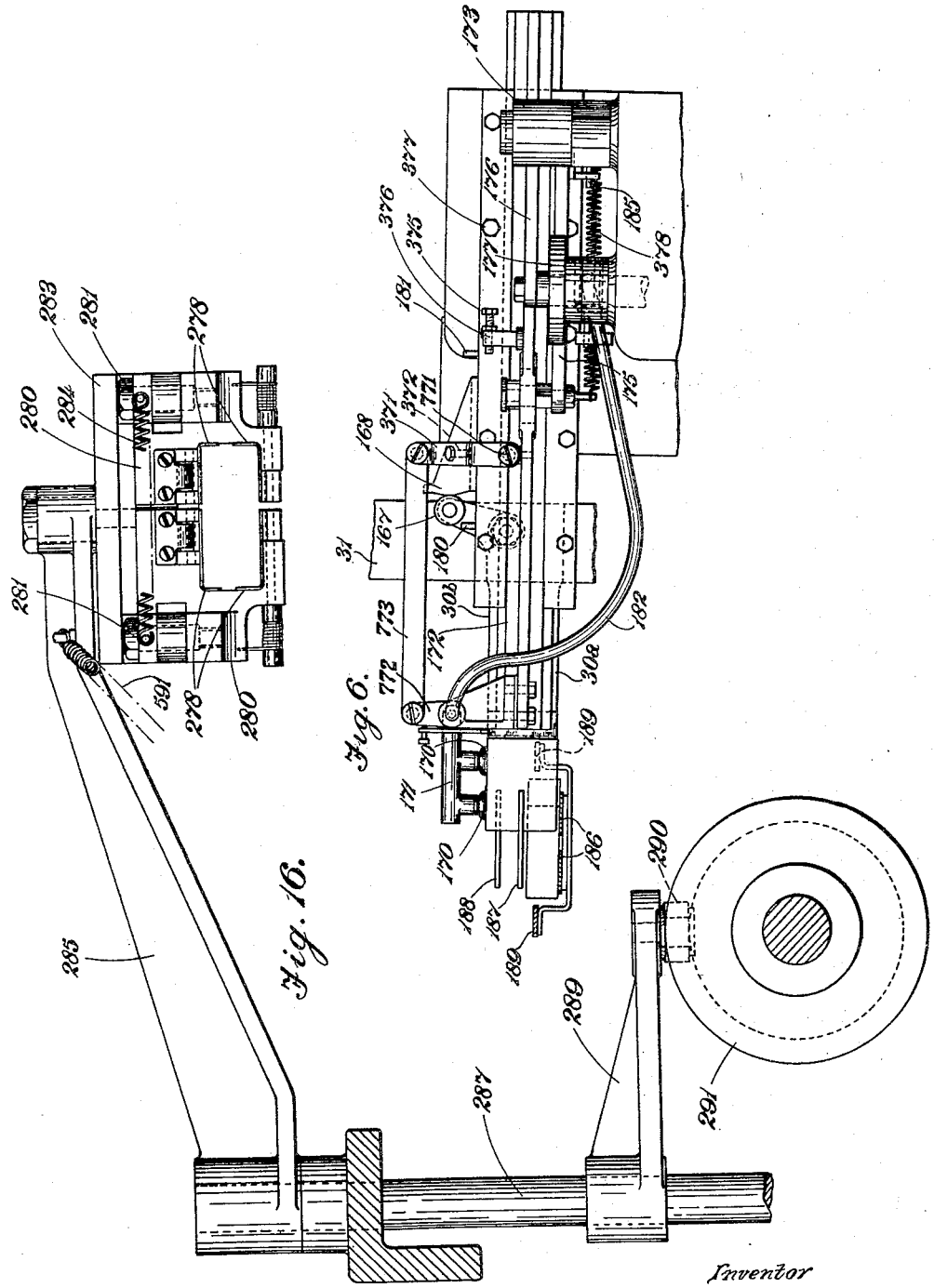

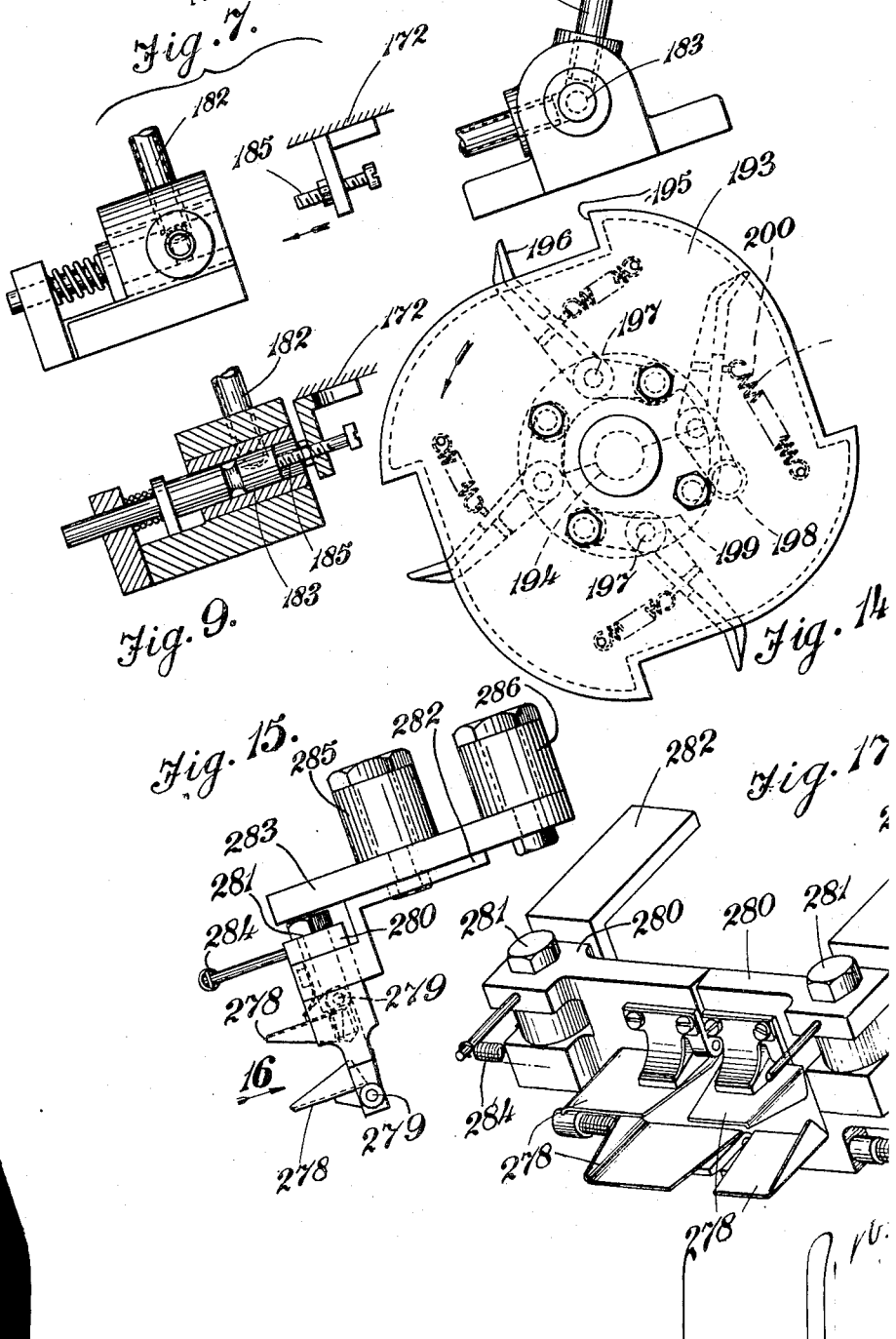

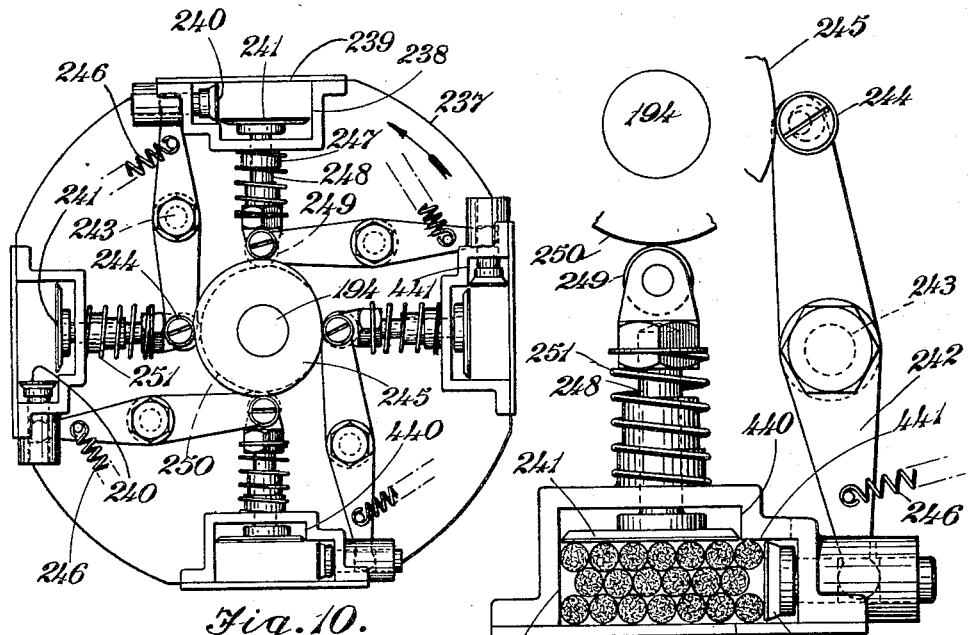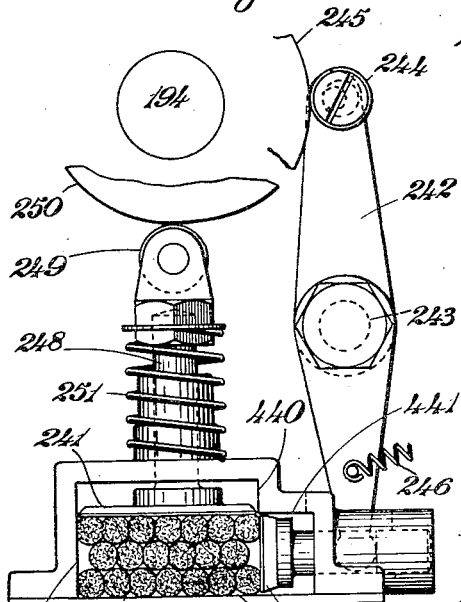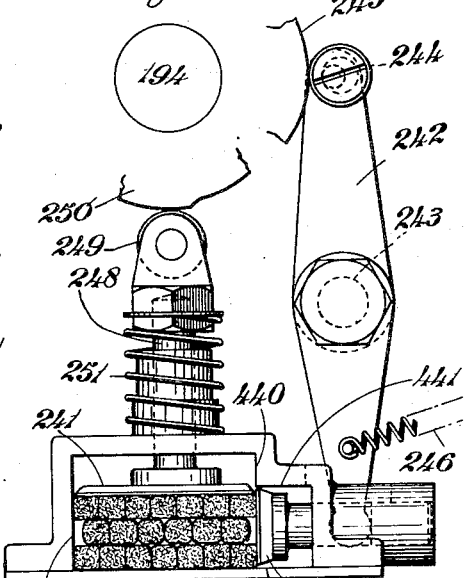

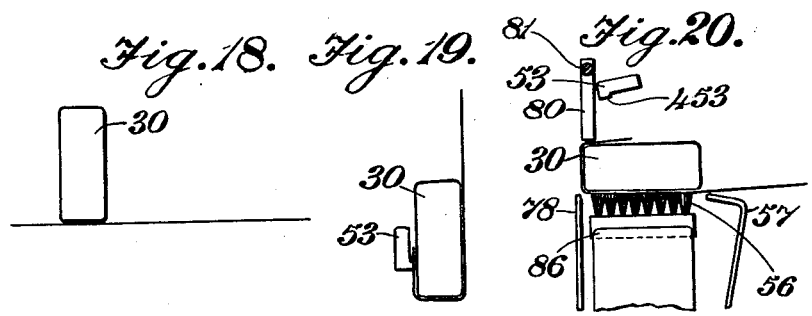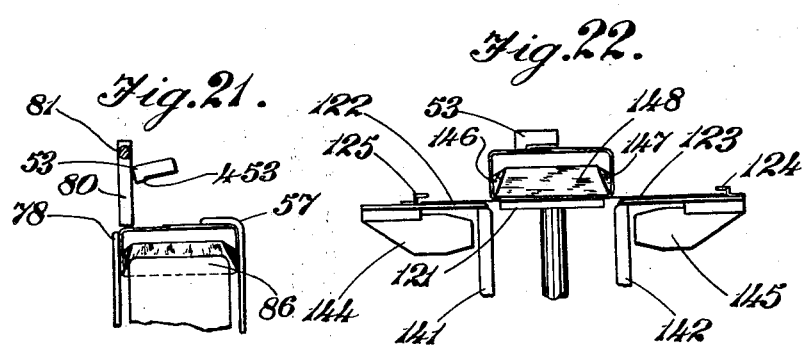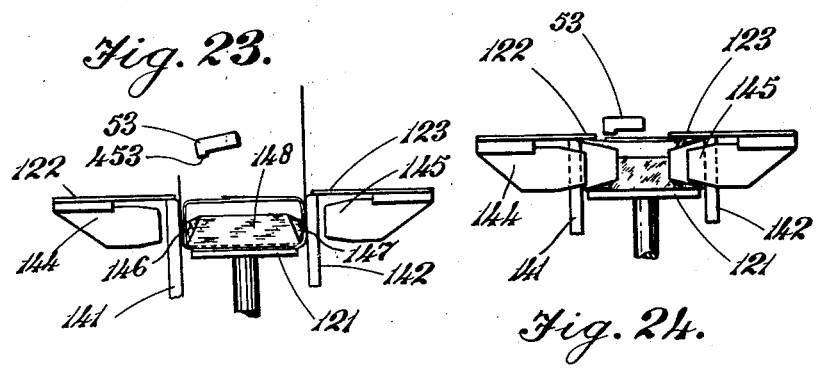

July 23, 1940.　　J. W. CHALMERS ET AL　　2,209,110
WRAPPING MACHINE
Filed Oct. 29, 1937　　20 Sheets-Sheet 18
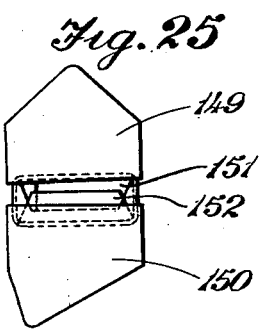
Fig. 25
Fig. 26
Fig. 27.
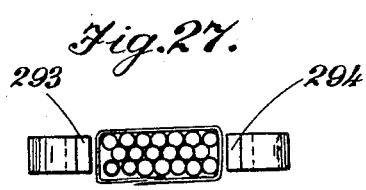
Fig. 28.
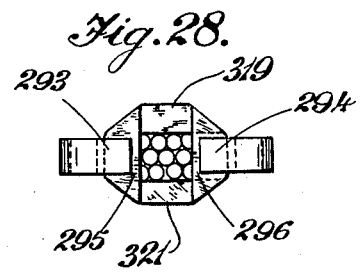
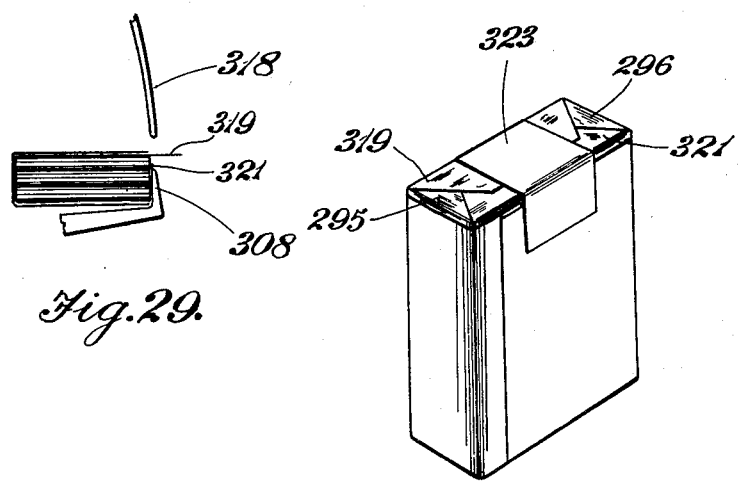
Fig. 29.
Fig. 30.

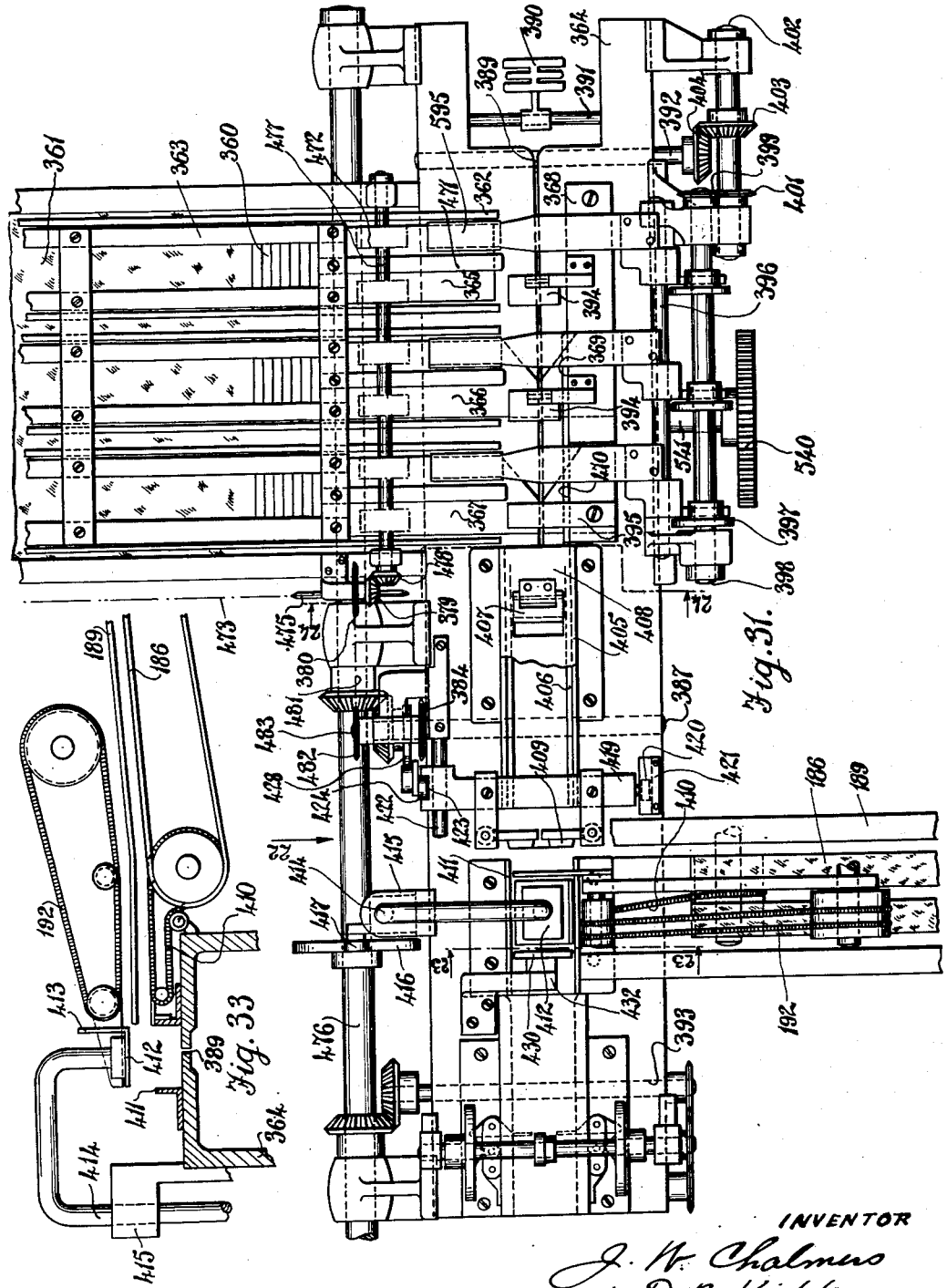

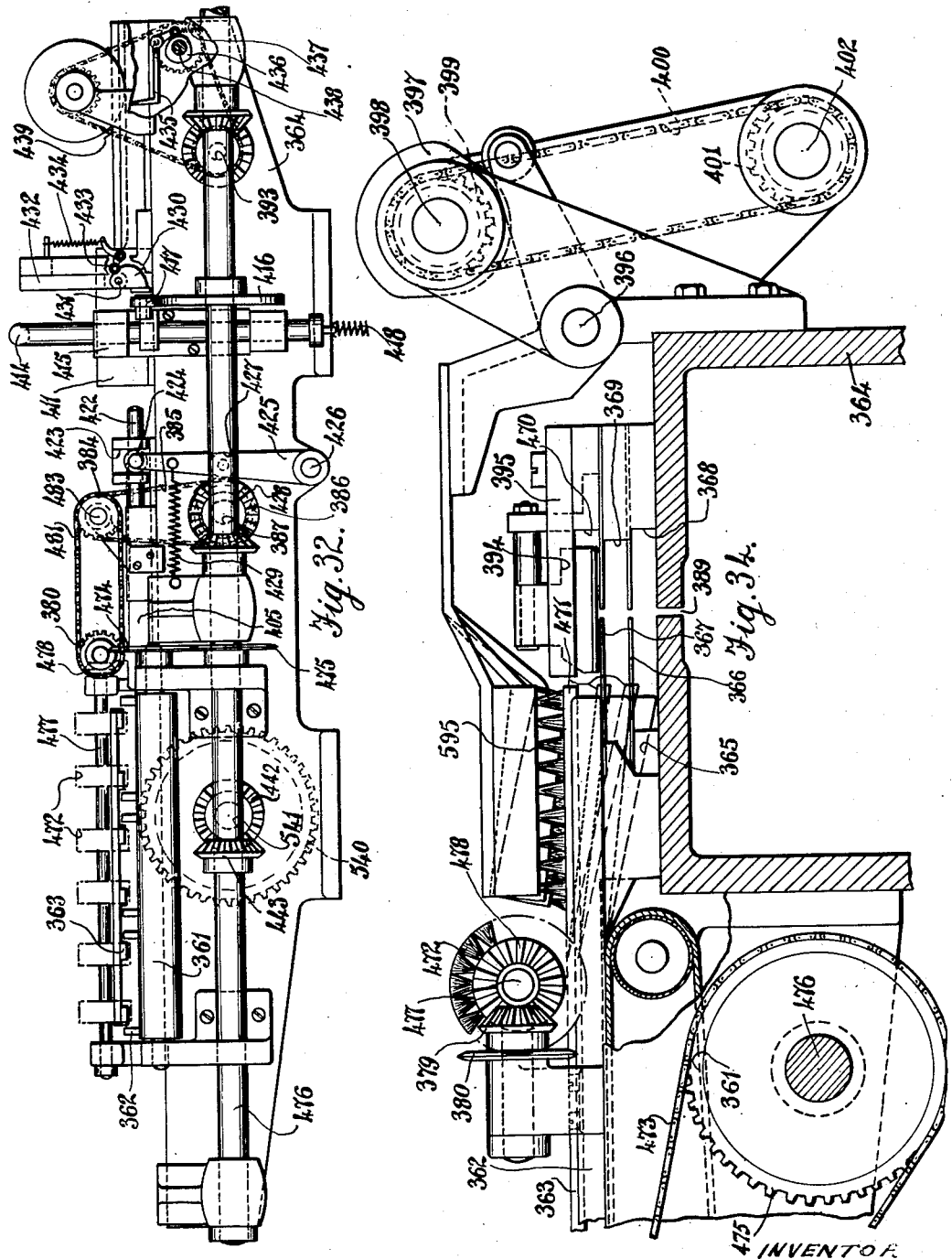

Patented July 23, 1940

2,209,110

UNITED STATES PATENT OFFICE 2,209,110

WRAPPING MACHINE

John Walker Chalmers and David Blewes Kidd, Deptford, London, England, assignors to Molins Machine Company, Limited, London, England Application October 29, 1937, Serial No. 171,796

16 Claims. (Cl. 93—3)

This invention is for improvements in wrapping machines and has particular reference to such machines when employed for wrapping batches of cigarettes in a wrapping comprising an inner and an outer wrapper. When using such wrappings for cigarettes the inner wrapper is often arranged completely to envelop the batch of cigarettes whilst the outer wrapper usually termed "a label" is of pouch form and is open at one end so that the end folds of the inner wrapper are accessible, thereby permitting access to the cigarettes by opening such end folds. The end folds of the inner wrapper which are disposed at the open end of the pouch are usually held in position by a band or revenue stamp extending across the open end of the pouch and secured to opposite faces thereof.

One object of the invention is to provide means whereby empty wrappers may be formed about a mandrel, the wrappers being open at one end to receive batches of cigarettes.

A further object of the invention is to provide means to fill the empty wrappers after they have been removed from the mandrels.

A still further object of the invention is to provide a conveyor operative to convey empty wrappers from the mandrels to the wrapper filling mechanism, the conveyor being so constructed that the empty wrappers may be inspected as they pass to the wrapper filling mechanism so that should improperly constructed wrappers be present they may be removed and replaced by properly formed wrappers before the filling position is reached. By this means wastage of cigarettes due to improperly formed wrappers being filled with cigarettes is reduced. These and other objects will be described hereinafter and set forth in the claims appended hereto.

The invention will be described by way of example as applied to a machine for wrapping cigarettes, but it will be appreciated that many modifications may, within the scope of the appended claims, be made to the machine described and illustrated.

In the drawings:

Figure 1 is a plan of a machine for wrapping batches of cigarettes.

Figure 1a and 1b show Figure 1 drawn to an enlarged scale.

Figure 2 is an elevation looking in the direction of the arrow 2, Figure 1.

Figures 2a and 2b show Figure 2 drawn to an enlarged scale.

Figure 3 is an elevation of the machine looking in the direction of the arrow 3, Figure 1.

Figures 3a and 3b show Figure 3 drawn to an enlarged scale.

Figure 4 is a sectional elevation on the line 4—4, Figure 1.

Figure 5 is an elevation partly in section taken on the lines 5—5, Figure 1.

Figures 5a and 5b show Figure 5 drawn to an enlarged scale.

Figure 6 is a side elevation showing mechanism for stripping formed wrappers from a mandrel.

Figure 7 shows a valve used in connection with the mechanism shown in Figure 6.

Figure 8 is a view of Figure 7 looking in the direction of the arrow 8.

Figure 9 is a sectional elevation of Figure 7, some parts being shown in different positions from those shown in Figure 7.

Figure 10 shows a detail of the filling mechanism illustrated in Figure 2.

Figures 11, 12 and 13 show the manner of operation of the mechanism illustrated in Figure 10.

Figure 14 shows a detail of mechanism to support a wrapping during the filling thereof.

Figure 15 shows a side view of mechanism for facilitating the insertion of a batch of cigarettes into an empty wrapper.

Figure 16 is a view looking in the direction of the arrow 16, Figure 15, and shows the cam for operating the mechanism.

Figure 17 is a perspective view of a part of the mechanism shown in Figure 15.

Figure 2B:
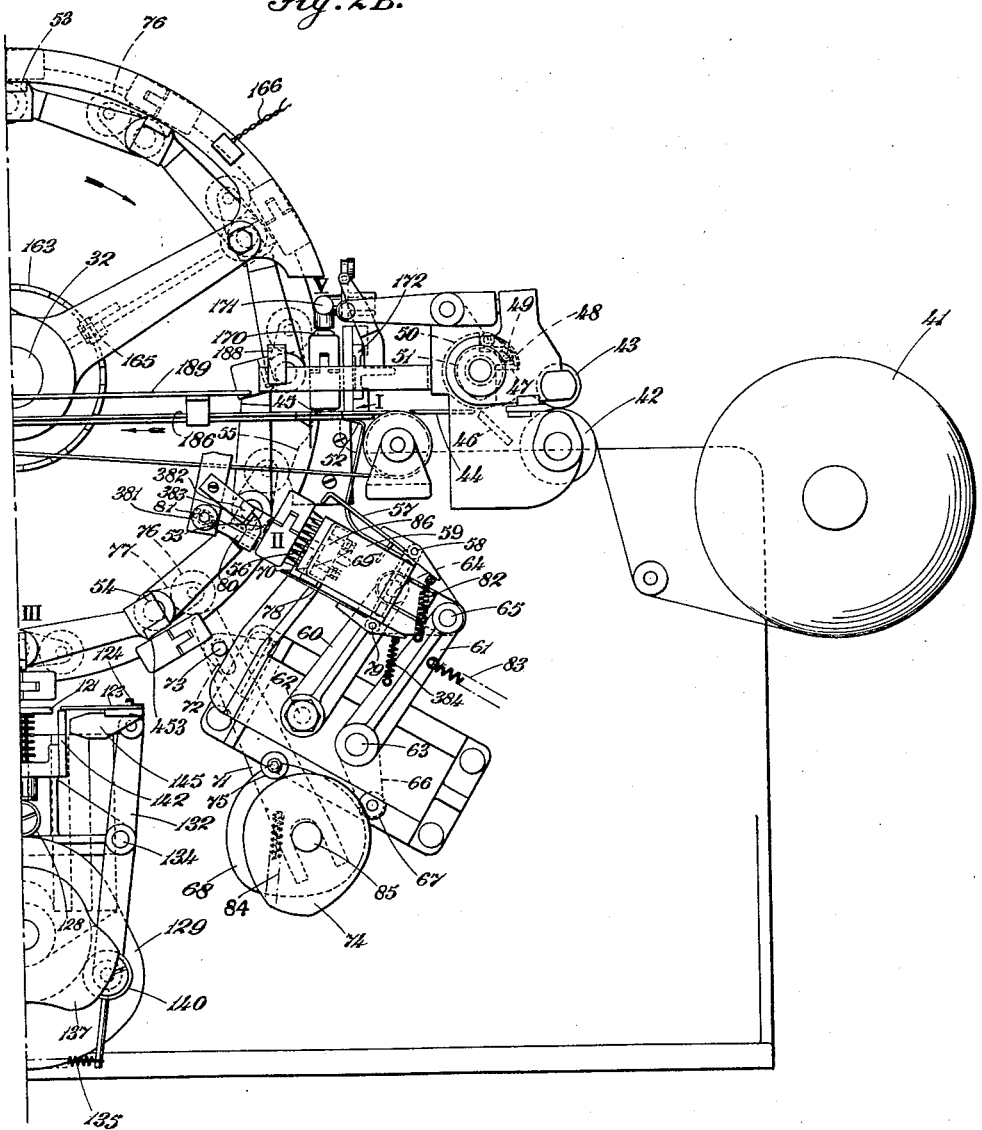

Figures 18 to 29 inclusive illustrate various successive operations during the forming, filling and closing of a wrapper, and Figure 30 is a perspective view of a completed wrapping.

Figure 31 shows a plan of a modified mechanism for inserting the cigarettes into the preformed wrapper.

Figure 32 is a side elevation of Figure 31 in direction of arrow 22.

Figure 33 is a section of Figure 31 on line 23—23.

Figure 34 is a section of Figure 31 on line 24—24 drawn to a larger scale.

Like reference numerals refer to like parts throughout the specification and drawings.

Referring to Figures 1 and 2 a plurality of mandrels 30 are supported by carrier 31 mounted for rotation about the axis of a shaft 32. Each of the mandrels 30 is divided into two parts 30a and 30b, the part 30a being rigidly connected with the carrier 31 whilst the part 30b is pivoted thereto for a purpose which will hereinafter appear.

The carrier 31 rotates in the direction of the arrow shown in Figure 2. Rotation of the carrier 31 is effected by a Geneva drive shown in Figure 3. A driven member 33 provided with radial slots 34 is bolted to the carrier 31 and a register 35 is provided between successive slots 34. The driven member 33 is intermittently moved by a roller 36 which is freely rotatable on a support 37 and enters each of the slots in succession. The support 37 is secured to a shaft 38 which shaft is continuously rotated. As can be seen from Figure 3, the support 37 is provided with an enlarged boss 39 which co-operates with the register 35, a segmental part 39a of the boss being cut away to enable the driven member 33 to rotate when the cut away portion of the boss 39 is adjacent the member 33.

A Geneva mechanism of this kind is well known, but it is found that in practice such mechanism is frequently noisy in operation due to some clearance which is necessary between the register and the cooperating part 39 of the support 37.

In order to reduce the noise the place at which the boss 39 co-operates with a register 35 is arranged to be submerged in oil contained in a container 40. The oil forms a film on the surface of the register 35 and the boss 39 and reduces the space, which space it will be appreciated is very small, between the register and the co-operating surface of the boss 39. The shaft 38 is, as previously stated, continuously driven and is driven from the main drive of the machine.

Each mandrel as will be seen from the drawing is of substantially oblong rectilinear cross-section and is moved into engagement with a length of wrapping material which is fed into the path of the mandrel.

For convenience the various positions at which operations are performed to fold a wrapper about a mandrel will be referred to as "stations." The first station indicated by the reference I is the station at which a mandrel first engages with a wrapper (see Figures 2b and 18). Wrapping material is fed from a reel 41 between feeding rollers 42 and 43 and on to a support 44. The support 44 is provided with a slot 45 through which a mandrel passes, thus forming the wrapper into a U shape about the leading narrow face of the mandrel (see Figure 19). When a length of wrapping material has been fed on to the support 44, a wrapper is severed from the web by means of a fixed knife 46 and a rotatable knife 47. A stripping element 48 is pivoted at 49 to the carrier 50 on which the knife 47 is mounted and the stripping element is operated by a fixed cam 51 to deflect the severed edge of the wrapping material away from the knife edge after a cutting operation. The mandrel moves through the slot 45 forming the wrapping material into a U about the leading narrow face of the mandrel, one limb of the U being shorter than the other as can be seen from Figure 19. The longer limb of the U is engaged by a guide 52 and is supported thereby during the movement of the mandrel and wrapper to station II. A pressing element 53 is arranged to co-operate with each mandrel, the pressing element being pivoted about the axis of a spindle 54 supported by the carrier 31 and first arranged to engage the shorter limb of the U and to hold the shorter limb against a broad face of a mandrel. This movement of the presser element 53 is effected by a fixed member 55. As the presser element passes the member 55 a roller 76 described below engages with the member 55. The longer limb of the U formed by the wrapping material is, whilst the mandrel is positioned at station II held against a broad face of the mandrel by a brush 56 (see Figure 20).

Whilst the mandrel is at station II the longer limb of the U formed by the wrapping material is folded about the narrow face opposite that narrow face of the mandrel about which the base of the U is formed and into overlapping engagement with the shorter limb of the U (see Figure 21). These folding operations are effected by means of a folding element 57 pivoted at 58 to a carrier 59. The carrier 59 is supported for movement towards and away from the mandrel at station II by a pair of parallel links 60 and 61. The links 60 and 61 are pivoted at 62 and 63 respectively to the frame of the machine and at 64 and 65 to the carrier 59. The link 61 is also connected with an arm 66 carrying a cam follower 67 which co-operates with a cam 68. The cam 68 causes the parallel links to be rotated about their pivots 62 and 63 thereby effecting movement of the carrier 59 and the folding operations above referred to. As the carrier 59 is moved towards a mandrel positioned at station II the folding element 57 engages the trailing end of the longer limb of the U of wrapping material and folds the trailing end against the narrow side face of the mandrel opposed to that about which the base of the U is formed. Continued movement of the carrier 59 causes a projection 69 on the folding element 57 to engage with an abutment 70 secured to the frame of the machine. The abutment 70 comprises a screw capable of adjustment and provided with a locking nut to hold the screw in position after it has been set. Engagement of the projection 69 with the abutment 70 causes the folding element 57 to turn about its pivot 58 thereby folding the upstanding trailing end of the wrapper into engagement with the shorter limb of the U as shown in Figure 21.

The folding element 57 is moved in timed relationship with the pressing element 53, the arrangement being such that the pressing element 53 is raised out of engagement with the shorter limb of the U just prior to the folding element 57 causing the trailing end of the wrapper to be folded into engagement therewith. The pressing element 53 is moved out of engagement with the shorter limb of the U by a lever 71 having a slot 72 which co-operates with a fixed pin 73. The lever 71 is guided by the pin 73 and slot 72 and is reciprocated by a cam 74 which co-operates with a cam follower 75 carried by the lever 71. The end of the lever 71 engages with a roller 76 supported by an arm 77 secured to the spindle 54. Engagement of the lever 71 with the roller 76 causes the presser element 53 to turn about the axis of the spindle 54 and out of engagement with the shorter limb of the wrapping material.

A further folding element 78 is pivoted at 79 to the carrier 59 and is movable therewith, being arranged to engage the base of the U as the carrier 59 is moved towards the mandrel and so to hold that part of the wrapper in position about the mandrel whilst the folding element 57 is operative to fold the trailing limb of the U.

The shorter limb of the U when the presser member 53 is moved out of engagement therewith is prevented from moving for any substantial distance away from the broad face of a mandrel against which it is folded by a guide 80 pivoted at 81 and controlled by a spring 381 and a stop 382 with which a foot 383 secured to the guide 80 engages. Before the folding element 57 disengages the flap folded thereby, the presser member 53 is caused to engage the overlapping portions of the wrapping material and to hold them in position about the mandrel. As the mandrel is moved away from station II the presser member 53 rotates the guide 80 about its pivot so as to permit the forward movement of the presser member 53. The guide 52 is secured to the carrier 59 for movement therewith and is arranged to bridge the slot 45 whilst folding operations are being effected at station II and whilst a further wrapper is being fed on to the support 44. The guide 52, therefore, prevents the end of a wrapper from entering the slot 45 before the wrapper is engaged by a mandrel and moved thereby through the slot.

The folding elements 57 and 78 are controlled by springs 82 and 384 respectively as can be seen from Figure 2.

A spring 83 maintains the cam follower 67 in engagement with the cam 68 and a spring 84 maintains the cam follower 75 in engagement with the cam 74. The cams 68 and 74 are mounted for rotation with a shaft 85 and it will therefore be seen that the operation of the presser member 53 and the folding elements 57 and 78 is effected in timed relationship.

After a folding operation has been effected by the folding elements 57 and 78, the pressing member 53 is moved downwardly and engages the overlapping portions of the wrapper, holding them in position against the broad face of the mandrel before they are released by the folding elements 57 and 78.

The wrapper is so placed about the mandrel that it projects beyond the free end face thereof and when the carrier 59 is moved towards the mandrel, a further folding element 86 secured to the carrier 59 engages with the outwardly extending portion of the wrapper which projects beyond the end face of the mandrel from that side thereof which is opposed to the side against which the edges of the wrapper are overlapped and folds the projecting portion upwardly into engagement with the end face of the mandrel (see Figure 21).

The folding operations above described being completed, the mandrel is moved to station III at which the second wrapper or label is applied to the mandrel and is folded thereabout. During movement of the mandrel from station II to station III, the first-applied wrapper is held in position upon the mandrel by the presser member 53.

As can be seen from Figure 2, the mandrel when in position at station III has its broad faces arranged in substantially horizontal planes and the label is moved upwardly into engagement with the lower broad face of the mandrel. The second wrapper or label is positioned prior to its movement into engagement with the mandrel, on a support whose supporting surface is arranged below that of the support 44. It will be seen, therefore, that whilst the support 44 is arranged to dispose a wrapper in the path of a mandrel, the support for the second wrapper or label is adjacent the path of the mandrel, and the arrangement of the two wrapper supports is such that whilst the first wrapper is first engaged by a narrow side of the mandrel, the second wrapper is first engaged by a broad side of the mandrel adjoining the narrow side first engaged by the first wrapper.

The label comprising the second wrapper is fed from the bottom of a pile of labels contained in a magazine 88. The labels are fed from the bottom of the pile one at a time by a gripper element 89 comprising a suction tube connected with a suction pump. The suction tube is carried by a bell crank lever 90 pivoted at 91 and oscillated about the pivot 91 by a connecting arm 92 pivoted at 93 to a support 94 which is pivoted at 95 to the frame of the machine.

The support 94 carries a cam follower 96 (see Figure 4) which co-operates with a cam 97 to effect oscillation of the bell crank lever 90 about the pivot 91. The suction tube 89 due to the movement of the bell crank lever 90 draws the labels one at a time downwardly so that the leading edge of a label is engaged between an idler roller 100 and the surface of a positively rotated roller 98. An arm 99 also pivoted at 95 supports the roller 100 which co-operates with the surface of the roller 98 to feed the label forwardly to a pair of feed rollers 101, 102. The arm 99 also supports a cam follower 103 which co-operates with a cam 104 and moves the roller 100 in timed relationship with the suction tube 89 so as to engage and feed forwardly a blank at the correct time. The cam followers 96 and 103 are held in position against the surfaces of the cams 97 and 104 respectively by springs, not shown. The rollers 101 and 102 feed the label forwardly between rollers 105 and 106, the roller 106 projecting through a support 107 over which the label is fed. Transfer elements 108 are arranged to transfer adhesive from a container 109 to the surface of 30 rollers, not shown, which applies adhesive to the label, pressure rollers 87, see Figure 1, being provided to press the label against the adhesive applying rollers. A scraping element 110 is provided to remove surplus adhesion from the surface of the transfer element 108. The adhesive applying rollers apply adhesive to the label at desired positions so that when the label is folded about the mandrel the folds made in the label will be held in position.

After adhesive has been applied to the label the latter passes between a still further pair of rollers 111 and 112 and the rear edge of the label is engaged by pusher elements 113, pivoted at 114 and at 514 and caused to move in the direction of movement of the label by means of operating elements 115, 116, 117 and 118, the operating elements causing the pusher 113 to be rotated about the pivot 114 through the medium of a cam follower 119 secured to the element 118 and co-operating with a cam 120. The pusher element 113 by reason of the fact that it engages the rear edge of a label, positively locates the label in the required position on the support from which position it is moved into engagement with the mandrel disposed at station III.

The support for the label comprises a plate 121 and the upper surfaces of a pair of folding elements 122 and 123. Guide elements 124 and 125 are provided to guide the edges of the label in the direction of feeding thereof.

The plate 121 and the folding elements 122 and 123 are supported by a carrier 126 mounted in a slide 127. The carrier 126 has connected thereto a cam follower 128 which co-operates with a cam 129. A spring (not shown) maintains the cam follower in engagement with the cam 129. As can be seen from Figure 2, the plate 121 is movable relatively to the carrier 126, being slidably mounted therein and controlled by a spring 130. The folding elements 122 and 123 are carried by supports 131 and 132 pivoted at 133 and 134 respectively. The lower ends of the supports are connected by a spring 135. The cam 129 is mounted on a shaft 136 on which shaft two further cams 137 and 138 are also mounted, the cams 137 and 138 being arranged to co-operate with cam followers 139 and 140 attached to the supports 131 and 132 respectively. By this means the folding elements 122 and 123 are operated in timed relationship with the plate 121 and with a pair of further folding elements 141 and 142 fixed to the carrier 126.

After a label has been placed in position on the support (see Figure 22) the carrier 126 moves upwardly, thus moving the label upwardly and into engagement with the underside of the first wrapper which is formed about the mandrel.

When the plate 121 engages the underside of the mandrel continued movement of the carrier causes the spring 130 to be depressed, the plate thereby holding the wrapper against the underside of the mandrel whilst the sprung folding elements 141 and 142 fold the wrapper upwardly against the vertical sides of the mandrel (see Figure 23). The upward movement of the carrier is such that the folders 141 and 142 cease to move when the upper portions thereof are substantially flush with the upper surface of the mandrel, and at this time the cams 137 and 138 cause the folding elements 122 and 123 to move inwardly, folding the upstanding portions of wrapping material downwardly in overlapping engagement against the upper surface of the mandrel (see Figure 24).

The pressing element 53 which is holding the overlapping portions of the first wrapper against the upper surface of the mandrel is moved away therefrom as the folding elements 122 and 123 become operative in order to permit the upstanding portions of the second wrapper to be overlapped against the upper surface of the mandrel. The cams 137 and 138 are so set that the folding element 122 is operative slightly in advance of the folding element 123 so that that portion of the wrapper which is folded downwardly by the folding element 123 overlaps that portion which is folded by the folding element 122. The portion of wrapping material which is folded downwardly by the folding element 123 has been supplied with adhesive by the mechanism above described so that when the upstanding portions of the wrapper are folded downwardly into overlapping engagement, they are caused to adhere to each other by reason of the adhesive. As the folding elements 122 and 123 are again moved outwardly by the cams 137 and 138 the presser member 53 is again moved into engagement with the mandrel and presses against the overlapping portions of the second wrapper. The presser member 53, as can be seen from the drawings, is provided with a slight projection 453 on the side thereof which engages the wrapper. The projection 453 is so arranged as to engage the wrapper directly above the position at which adhesive is placed between the overlapping parts thereby causing better adherence of the overlapping parts.

The movement of the presser member 53 when the latter is operative at station III is effected by a cam 143 which co-operates with the roller 76. The cam 143 is moved in timed relationship with the cams 129, 137, 138.

A pair of further folding elements 144 and 145 are connected with the folding elements 122 and 123 respectively for movement therewith. The folding elements 144 and 145 are arranged to form narrow side folds 146 and 147 in those portions of the first and second wrapper which project beyond the end of the mandrel. As the folding elements 122 and 123 are moved inwardly the folding elements 144 and 145 move inwardly also thereby folding the projecting narrow portions of the first wrapper against the end face of the mandrels.

The first wrapper comprises a metal or other foil wrapper preferably lined with a paper liner on that side which is to engage the cigarettes when the latter are inserted into the formed wrapper, whilst the second wrapper or label usually comprises a paper wrapper. Whilst it is a simple matter to secure the folds of the paper wrapper together by adhesive, it is considerably more difficult to secure folds formed in the foil wrapper either when the adjacent folds to be secured are both foil, or when one fold is foil and the other paper. By reason of the fact that the flap 148 is folded beneath the narrow end flaps 146 and 147 it is possible more easily to secure the end folds of the wrapper, because when the further folding operations about to be described are completed, the adjacent folded portions of material which are to be secured to hold the end folds in position are folds formed from the paper wrapper.

After the folding operations above described have been completed, the carrier 31 is moved a further stage and the mandrel is moved to station IV. At station IV a pair of folders 149 and 150 are arranged to form the final closure flaps 151 and 152 respectively. The folders 149 and 150 are pivoted to arms 153 and 154 respectively, each of the arms 153 and 154 being pivoted at 155. Cam followers 156 and 157 connected with the arms co-operate with a cam 158, which cam causes the arms to be operated one after the other to perform the folding operations. The cam followers 156 and 157 are held against the cam 158 by springs (not shown). The folding element 149 is first operated and moves downwardly thereby folding the closure flap 151, which flap comprises wrapping material from both the first and the second wrappers arranged so that the second wrapper is outermost, against the end face of the mandrel. The folder 150 then moves upwardly folding the closure flap 152, comprising the projecting portion of the second wrapper, upwardly into engagement with the closure flap 151 (see Figure 25).

Since the flap 148 has been folded at a previous time, that is, by the folder 86, the flap 152 comprises only a portion of the second wrapper and the engaging portions of the closure flaps 151 and 152 are therefore both paper surfaces. Adhesive which was applied to the second wrapper in the manner above described secures the closure flaps 151 and 152.

The folding elements 149 and 150 are pivoted at 159 and 160 to the arms 153 and 154 respectively, the arrangement being such that during the folding operation the pivoted folders 149 and 150 are urged against the end of the mandrel by springs (not shown).

As can be seen from the drawing, each of the folding elements 149 and 150 is also shaped so that one corner or side of the projecting portion of the wrapper which forms a closure fold is engaged by the folding element before the whole of the closure flap is engaged by the folding element. By this means the closure flaps are folded about the end face of the mandrel in a manner such that they are tightly formed thereabout. The folding element 150 is timed relatively to the movement of the mandrel that the fold 152 is retained in position by the element 150 until the fold 152 is engaged by a presser element 161 referred to below.

The formation of the empty wrapper is now completed and the wrapper is carried by the mandrel through a number of idle stations not enumerated, to a station V which is adjacent station I. At station V an empty wrapper is stripped from the mandrel about which it has been formed.

Whilst a finished wrapper is being moved from station IV to station V the end folds of the wrapper are engaged by a presser element 161 mounted on a three-armed support 162 which support is slidably mounted on the shaft 32 and urged by a spring 164 towards a cam 163 secured to the carrier 31, see Figure 4. The cam 163 is in the form of a circular rack and projections 165 on the support 162 engage with the cam 163 thereby causing the presser bar 161 to be moved into and out of engagement with the end folds of the wrappers. To prevent undue rubbing of the end folds of the wrappers the cam 163 is arranged to move the presser bar 161 out of engagement with the end folds whilst the mandrels are moving from one position to another. The bar 161 is heated in order further to facilitate the drying of the adhesive securing the end folds of the wrappers. Heating of the bar is effected by a resistance coil, not shown, which coil is included in the bar 161 and connected with a source of electrical power by means of wires 166. The pressure exerted by the bar 161 against the end folds may be adjusted as desired.

The pressing elements 53 also are provided with electrical heating elements, not shown, and are connected with a source of electrical power so that the drying of the adhesive between the overlapping portions of the second wrapper which are held in position by the presser members 53 may be facilitated.

As a mandrel approaches station V a roller 167 secured to the pivoted portion of the mandrel 30b engages with a fixed cam 168, thus causing the pivoted portion 30b to move inwardly compressing the spring 169 and reducing the size of the mandrel. When, therefore, the mandrel arrives at the station V the wrapper is of greater internal cross-section than the cross-section of the mandrel, and this facilitates the removal of the wrapper from the mandrel. The wrapper is removed from the mandrel by means of a pair of suction cups 170 (see Figures 1, 2 and 6) secured to a support 171 which is pivoted to a bracket supported by a carrier 172. The carrier 172 is slidable lengthwise of the mandrel and is moved by an arm 173 pivoted at 174 and a connecting link 175 connecting the arm 173 with the slidable carrier 172. The arm 173 is oscillated about its pivot 174 by a link 176, one end of which is eccentrically connected with a rotatable disc 177, the other end being connected with a pin 178 arranged to move in a slot 179 formed in the arm 173.

At each end of the stroke of the carrier 172 there is provided a stop, one stop being indicated by the reference numeral 180, the other by the reference numeral 181. As the carrier 172 approaches each end of its stroke, the support 171 is caused to turn about its pivot by reason of the engagement with a stop 180 or 181 of a projection 372 on an arm 371 pivoted at 771 to the carrier 172. A further arm 712 is secured to the pivot of the support 171 and is parallel with the arm 371 and connected with the arm 371 by a link 773. By this means when, due to the projection 372 engaging the stop 180 or 181, the arm 371 is turned about its pivot 771 a corresponding movement is imparted to the arm 712, thus causing the support 171 to be moved upwardly or downwardly according to whether the projection 372 engages the stop 181 or the stop 180.

At the end of the stripping action, that is, when a wrapper which has been removed from a mandrel by the suction cups, is released from the grip of the suction cups, the support is moved upwardly due to the engagement of the projection 372 with the stop 181, whilst at the end of its return stroke when the support is again in position about a mandrel from which a wrapper is to be stripped, engagement of the projection 372 with the stop 180 causes the support to be moved downwardly so that the suction cups 170 engage with the upper narrow side of the wrapper which is about the mandrel. The support 171 is provided with an aperture which communicates with the suction cups 170 and a flexible pipe 182 connects the support 171 with a valve 183, which valve is connected with a suction pump diagrammatically indicated at 184. The valve 183 is operated by a pin 185 carried by the link 175 and arranged to depress the valve at the end of the stripping stroke of the carrier 172 thereby cutting off the suction so that the cups 170 release the wrapper which then falls on to the surface of a pair of conveyor bands 186. Connection between the link 175 and the arm 173 is effected by a screw 373 which is secured in the arm 173 and has a shank slidable in a slot 374 formed in the link 175. An adjustable screw 375 is locked in position in a bracket 376 secured to the support 172 and is arranged to engage a fixed stop 377. A spring 378 is provided normally to maintain the screw 373 in the position shown in Figures 1 and 1a. When, however, the screw 376 engages the stop 377 relative movement is effected between the support 172 and the link 175 whereby the support remains stationary, thus permitting the suction cups properly to grip a wrapper to be removed from a mandrel before the support is again caused to move towards the conveyor bands 186.

An empty wrapper is deposited upon the bands 186 in a manner such that the wrapper is stood upon one of its narrow sides. The wrapper deposited on the bands is positioned between two guides 187 and 188 which are arranged above the bands 186, the guide 188 being disposed at a greater distance above the bands 186 than is the guide 187. Movement of the bands 186 in the direction of the arrow (see Figure 2) causes the empty wrapper positioned between the guides 187 and 188 to engage with the guide 188 and the continued movement of the bands 186 causes the portion of the wrapper which engages the bands to be moved forwardly while the forward movement of the upper part of the wrapper is prevented by the guide 188. The empty wrapper is therefore tilted against the guide 187 and continued movement of the bands 186 causes the wrapper to slide down the guide 187 and beneath the guide 188 so that the empty wrapper is arranged upon a broad face thereof with the seam uppermost on the bands 186. Guides 189 are provided to prevent undue movement of the wrappers transversely of the direction of movement of the bands 186. As can be seen from Figure 2, the bands 186 are of a length such that a number of empty wrappers are, during the operation of the machine, positioned upon the bands at one time, and this arrangement permits the machine minder to inspect the wrappers being carried by the bands 186, so that should a wrapper not be properly formed the machine minder can remove the defective wrapper and replace it with a good wrapper which has been made at some previous time. By this means wastage on the machine is reduced, because improperly formed wrappers are not filled with cigarettes but are removed prior to the filling operation. The bands 186 deliver the empty wrappers on to a stationary support 190, the wrappers being moved along the support by reason of successive wrappers engaging with each other and pushing each other along. The wrappers are moved over the support 190 against a stop 191 by means of which they are aligned for insertion into pockets of a conveyor described below. The closed ends of the wrappers are located against the adjacent guide 189 by a spring band or bands 192 which engage with the upper surfaces of the wrappers. The bands 192 are inclined to the direction of movement of the wrappers and engage the upper surface of a wrapper at a position adjacent the closed end of the wrapper, which end of the wrapper it will of course be appreciated, is the stronger, due to the folds formed therein. The band 192 moves in the direction of the arrow shown in Figure 2, and the effect of the band 192 is to urge the wrappers towards the guide 189.

The empty wrappers are delivered in succession from the support 190 into pockets formed in a carrier 193 mounted for rotation with a shaft 194 (see Figure 14). Each of the pockets in the carrier 193 comprises a fixed side 195 and an opposed and movable side 196. The movable side 196 comprises an arm pivoted at 197 to the carrier 193, each of the arms being provided with a projection arranged to carry a cam follower 198 which engages with a fixed cam 199. A spring 200 is arranged to maintain the cam follower 198 against the cam 199. The movable side 196 is arranged to move below the surface of the periphery of the carrier 193 as can be seen from Figures 2 and 14, the periphery of the carrier being slotted to permit the movement of the movable side 196. The bottom of a pocket is formed by the periphery of the carrier 193, and a gradually curved surface connects the bottom of one pocket with the top of the fixed wall of the next preceding pocket considered in the direction of rotation of the carrier 193.

An empty wrapper is received into a pocket in the following manner. The stop 191 against which the empty wrappers are aligned is connected with a further stop 201 which is arranged to prevent endwise movement of the wrapper in the direction of movement of the batch of cigarettes being inserted into the wrapper during a filling operation. The stop 201 is supported by a pair of parallel links 202 and 203 pivoted to the frame of the machine at 204 and 205 respectively, a cam follower 206 being supported by the link 203 and co-operating with a cam 207, a spring 208 being provided to retain the cam follower 206 in engagement with the surface of the cam 207. After a wrapper has been aligned against the stop 191, which operation is effected whilst the next preceding wrapper is being inserted into a pocket, the stop 191 is raised by the cam 207 to permit the aligned wrapper to pass. The forward movement of the aligned wrapper is arrested by an abutment 209 which projects from the under-surface of the plate 210 of which the stop 191 forms part, and which is secured to the stop 201.

The abutment 209 aligns the wrapper in position above a pocket, and the operation is such that when a wrapper is aligned against the stop 209 the wrapper is supported by the moving surface of the periphery of the carrier 193, which at that time is moving in the direction of the arrow shown in Figures 2 and 7. The continued movement of the carrier 193 causes the wrapper gradually to be lowered because of the shape of the periphery of the carrier above described, but in order to ensure the correct positioning and lowering of the wrapper the cam 207 is arranged to lower the plate 210 in timed relationship with the movement of the carrier, so that the under-surface of the plate 210, together with the stop 209, retains the empty wrapper in position on the periphery of the carrier. When movement of the carrier causes the wrapper to be engaged by the fixed wall of a pocket and the bottom thereof, the movement of the carrier which is intermittent is arrested, and the empty wrapper is retained in the pocket, which is at that time in the upper position shown in Figure 2, until the wrapper has been filled with a batch of cigarettes. A wrapper deposited upon the bottom of the pocket is engaged by the movable side 196 in a manner such that the wrapper is caused substantially to assume the cross-section of the pocket as defined by the movable and fixed sides and the bottom of the pocket and the under-surface of the plate 210.

The wrapper, which when it was deposited in the pocket was probably of uneven shape due to the fact that when a wrapper is removed from a former there is nothing properly to retain the shape of the wrapper, is therefore squared up within and by the pocket. The wrapper now is ready to receive a batch of cigarettes.

Cigarettes which are to be inserted into wrappers are contained in a hopper 211 and pass through an outlet therein between vanes or partitions 212 and thence on to a bed 213 of the machine. The bulk of the cigarettes in the hopper is supported on each side of the opening through which the cigarettes pass through the partitions 212 by fixed guides 214 and 215, the shortest distance between the ends of the supports 215 and the supports 214 comprising an opening through which cigarettes can pass a few at a time. An agitating member 216 pivoted at 217 is arranged to oscillate above the outlet through which the cigarettes pass and to agitate the cigarettes passing to the outlet to maintain a steady flow of cigarettes to the outlet.

The cigarettes after passing between the partitions 212 are deposited upon the bed of the machine, and the lowermost rows of cigarettes, for example three superimposed rows of cigarettes, are slightly compressed by a pair of elements 218 and 219 supported by carriers 220 and 221 pivoted at 222 and 223 respectively. The carriers 220 and 221 are moved towards each other during the compression of a batch of cigarettes by a cam 224 which co-operates with a cam follower 225 supported by a link 226 co-operating through the medium of further links 726 with arms 227 secured to the spindles by which the carriers 220 and 221 are pivoted.

A stop 228 is arranged beneath one end pair of partitions to prevent a cigarette falling into the bottom row, so that when a batch of cigarettes is received on the bed of the machine the bottom row is numerically inferior to the next succeeding row by one cigarette.

The batch of cigarettes below the partitions is moved from beneath the partitions along the bed of the machine by one of a number of pusher pieces 229 carried by an endless chain conveyor 230. A plate 231 (see Figure 5) is supported by an arm 232 pivoted at 233 to a bracket 234 secured to the bed 213, and is operated by a cam 531 (see Figure 3) in a manner such that the plate 231 moves upwardly behind a pusher piece 229 as the latter moves a batch of cigarettes from beneath the hopper and supports the cigarettes above the conveyor whilst the conveyor is moving a batch from beneath the hopper. After the pusher 229 has moved a batch of cigarettes from beneath the hopper the plate 231 is lowered thereby permitting the cigarettes in the hopper to be lowered on to the bed 213 of the machine.

The batch of cigarettes moved from beneath the hopper is passed between side guides 235 each provided with a projection 236 so arranged as to cause one of the cigarettes of the middle row to be moved into the lower row. By this means the batch comprises three rows of which the upper and lower rows each contain seven cigarettes and the middle row contains six cigarettes. The pusher piece moves the batch of cigarettes into a pocket of a carrier 237 mounted for rotation about an axis which is co-axial with the axis of rotation of the carrier 193 and is then tripped backwardly beneath the bed of the machine.

If desired, the cigarettes, instead of being fed from a hopper as above described, may be delivered to the wrapping machine directly from a cigarette making machine. In such instances the cigarette making machine may be arranged to make cigarettes of substantially square cross-section thus reducing the necessity of applying a relatively great compression to a batch of cigarettes in order to reduce the cross-section of a batch substantially to the size of the internal cross-section of the wrapper into which the batch is to be inserted. The cigarettes, when delivered to a wrapping machine from a cigarette making machine may, if desired, be passed through a drying apparatus as they pass from the cigarette making machine to the wrapping machine.

The construction of the pockets and the carrier 237 is shown more clearly in Figure 10. From Figure 10 it will be seen that each of the pockets comprises two fixed sides 238 and 239 and two movable sides 240 and 241, each fixed side being opposed by a movable side. The movable side 240 is slidably supported in guides and is connected with an arm 242 pivoted at 243, the arm 242 supporting a cam follower 244 which co-operates with a fixed cam 245, a spring 246 being provided to maintain the cam follower 244 in engagement with the cam 245. The movable side 241 is slidably supported in a bearing 247 being provided with a stem 248, the lower end of which supports a cam follower 249 arranged to engage with a fixed cam 250. A spring 251 maintains the cam follower 249 in engagement with the cam 250. Cigarettes are delivered into a pocket when the pocket is in the lower position shown in Figure 10, and whilst the movable sides 240 and 241 are arranged at their furthest distance from the fixed sides 238 and 239 respectively. As the carrier 237 moves in the direction of the arrow indicated in Figure 10 the cams 249 and 250 cause the movable sides to move towards the fixed sides of the pocket, thereby compressing the batch of cigarettes in the pocket substantially to the internal cross-section of the wrapper into which the batch is to be inserted. The cross-section to which the batch is compressed is of course slightly smaller than that of the wrapper into which the batch is to be inserted.

As can be seen from Figures 10 to 13 the pockets are so formed that the cigarette engaging surface of the movable side 241 is, when the side 241 is in its retracted position, in the plane of a fixed wall 441. A further fixed wall 440 adjoins the wall 441 and is arranged at right angles to the wall 441. The wall 240 is moved in advance of the wall 241 and completes its movement before the wall 241 is moved out of the plane of the fixed wall 441. The wall 240 is advanced until as can be seen from Figure 11, the cigarette engaging surface thereof is in the plane of the fixed wall 440 when the movement of the wall 240 ceases and the wall 240 is arranged to remain in the plane of the fixed wall 441 whilst the wall 241 is moved out of the plane of the fixed wall 441 and towards the fixed wall 239 to complete the compression of the batch of cigarettes contained in the pocket (see Figure 13). By means of the arrangement just described, when either the wall 240 or the wall 241 is being moved during a compressing operation, the cigarettes are contained in a compartment which comprises three adjoining, substantially unbroken cigarette engaging surfaces between which the cigarettes are compressed due to the movement of the fourth cigarette engaging surface. This arrangement reduces the likelihood of one or more of the cigarettes becoming pinched during the compressing of a batch of cigarettes when, as in the present instance, compression of the batch is effected between two adjoining fixed walls and two walls movable at right angles one to the other.

The carrier 237 brings a compressed batch into the position shown in the upper position of Figure 10, at which position the compressed batch of cigarettes is in alignment with a wrapper into which the batch of cigarettes is to be inserted (see Figures 2 and 26). Before a compressed batch is removed from a pocket of the carrier 237, the cams 249 and 250 cause the walls 240 and 241 slightly to be retracted to facilitate the removal of the batch from the pocket.

Each of the carriers 193 and 237 is intermittently rotated on a common shaft by means of a Geneva driving movement which comprises a rotatable member 252 having radial slots 253 with which a roller 254 supported by a continuously rotatable arm 255 co-operates. The arm 255 is secured to a shaft 256 which is continuously rotatable from the main drive of the machine. A register 257 is provided between each successive pair of slots 253 and a boss on the arm 255 co-operates with the register in a manner similar to that described above with reference to the driving mechanism of the carrier 31 on which the formers 30 are mounted. When in the position at which the register 257 and the boss on the arm 255 co-operate, the co-operating parts are submerged in oil contained in a container 258. The member 252 is mounted on a shaft 259 to which is secured a gear wheel 260 (see Figure 1) which meshes with a pinion 261 secured to the shaft 194. By this means intermittent movement is imparted both to the carrier 193 and to the carrier 237.

The batch of cigarettes is removed from the pocket in the carrier 237 by a reciprocating plunger 262 which is slidably mounted in bearings 263 and 264 (see Figure 1) movement being imparted to the plunger by an arm 265 mounted on a shaft 266. Movement of the plunger is effected by a pair of cams 267 and 268 which co-operate with cam followers 269 and 270 respectively carried by arms 271 and 272 secured to the shaft 266. The arrangement is such that one of the cams is operative to move the plunger forwardly and eject a batch of cigarettes from a pocket of the carrier 237 into an empty wrapper in a pocket of the carrier 193, whilst the other cam is operative to return the plunger after the filling operation. Whilst the plunger 262 is operative to insert a compressed batch of cigarettes into an empty wrapper a further plunger 273 (see Figure 5) is operative to eject a filled wrapper from a pocket in the lower position of the carrier 193. The simultaneous movement of the plungers 262 and 273 is effected by reason of a link 274 which is connected with one end of the arm 265 and with a further arm 275 pivoted at 276. The arm 275 is connected with the plunger 273 by a link 277. Thus it will be seen that movement of the arm 265 by the cams 267 and 268 causes the plungers 262 and 273 simultaneously to operate.

In order to facilitate the insertion of the compressed batch of cigarettes into the empty wrapper a mouthpiece is arranged to be moved into the open end of the empty wrapper prior to the insertion of the cigarettes. The mouthpiece comprises four wrapper engaging elements 278 each of which is arranged to engage two adjoining sides of the wrapper and is provided with a rounded portion shaped suitably to conform with the rounded corners of the wrapper. The wrapper engaging elements 278 are arranged in pairs, each pair comprising one element arranged above the other and are pivoted at 279 to a carrier 280, each of the carriers 280 being pivoted at 281 to a support 282 which is mounted on a carrier 283. The carriers 280 are urged together by a spring 284, and since the pivots 279 and 281 are arranged at right angles to each other there is provided a yielding mouthpiece which is moved in timed relationship with the plunger 262 into the open end of the empty wrapper. As the plunger 262 moves the batch of cigarettes through the mouthpiece into the wrapper, the wrapper engaging elements of each pair are moved outwardly away from each other to engage with the top and bottom inner surfaces, that is, the broad sides of the wrapper and the carriers 280 are rotated about their pivots 281 so that the pairs of wrapper engaging elements 278 engage with the upright or narrow sides of the empty wrapper. By this means the insertion of the cigarettes into the wrapper is facilitated.

The carrier 283 is supported by a pair of parallel arms 285 and 286 secured to rotatable spindles 287 and 288 respectively. To the spindle 287 there is secured a further arm 289 which supports a cam follower 290 arranged to cooperate with a cam 291, a spring 591 (see Figures 1 and 16) serving to retain the cam follower 290 against the cam 291. The cam 291 causes rotation of the spindle 287 and due to the parallel linkage the mouthpiece on the carrier 283 is moved in a straight line into and out of the open end of a wrapper in timed relationship with the plunger 262.

As above described, whilst a batch of cigarettes is being inserted into an empty wrapper in the upper position a filled wrapper is being removed from the pocket which is in the lower position by the pusher 273. The plunger 273 moves the filled wrapper out of the pocket of the carrier 193 and leaves the wrapper in a stationary position on a plate 292. The plunger 273 engages with the cigarettes in the open end of the wrapper, and it will be seen, therefore, that when the filled wrapper is moved by the plunger 273 it is moved closed end foremost.

The open end of the wrapper is closed by folding that end of the first wrapper which projects beyond the end faces of the cigarettes. The finished form of the second wrapper is, as previously stated, an open ended cup or tube the open end of which terminates at a position substantially level with the end faces of the cigarettes at the open end of the wrapper which is about to be closed.

Whilst the wrapper is in the stationary position on the plate 292 folding elements 293 and 294 (see Figures 1 and 5) are arranged to move inwardly and form the narrow end folds 295 and 296 (see Figure 28). The folding elements 293 and 294 are mounted on supports 297 and 298, the elements being pivoted to the supports at 299 and 300. The supports are pivoted to the machine at 301 and 302 and carry cam followers 304 and 305 which engage with cams 306 and 307. By the inward movement of the folding elements 293 and 294 the narrow flaps 295 and 296 are swung inwardly against the end faces of the cigarettes and the folding elements 293 and 294 are trapped and held against the folded flaps by a hook shaped spring plate 494. The plate 494 prevents a swinging movement of the folding elements 293 and 294 on their return movement and the folding elements are, therefore on their return movement caused to move in a plane substantially parallel with the plane of the end faces of the cigarettes.

During the folding operation just described the filled wrapper is gripped between the plate 292 and a gripper 370 supported by a flat spring 371. The gripper is provided with a freely rotatable cam follower 372 which co-operates with a cam 473 arranged to depress the gripper 370 at predetermined intervals.

Just before the folding elements 293 and 294 disengage the folded portions 295 and 296 a further folding element 308 pivoted at 309 is caused to move upwardly through a slot 310 in the bed 311 over which the plunger 273 has moved the filled wrapper on to the plate 292. The upward movement of the folding element 308 causes the lower projecting portion of the first wrapper to be folded upwardly into engagement with the narrow end folds 295 and 296. The folding element 308 is operated by a cam 312 which is secured to the plunger 273. The folding element 308 is secured to a bell crank lever 313 one arm of which supports a roller 314. As the plunger 273 moves forwardly moving a filled wrapper on to the plate 292 the cam 312 pivots the bell crank lever 313 so that the folding element 308 remains beneath the level of the plate 292 and the bed 311. On the return movement of the plunger 273 the bell crank 313 again rotates about its pivot, being urged by a spring, not shown, and the folding element 308 moves upwardly through the slot 310 and performs the folding operation above described.

The next wrapper being moved on to the plate 292 by the plunger 273 causes the partly closed wrapper to be moved into position to be engaged by one of a number of pusher pieces 315 carried by an endless chain 316 and the arrangement is such that the folding element 308 holds the folded flap 321 in position until the flap 321 is almost engaged by the next succeeding wrapper. As can be seen from Figure 28 the flap 319 is folded upwardly when the folds 295 and 296 are formed, the fold 319 extending into the slot in the top plate 320 through which slot the gripper 370 protrudes. By so folding the flap 319 upwardly it is not damaged when the next succeeding wrapper engages the wrapper of which the flap 319 forms part.

The wrapper engaged by a pusher 315 is moved upwardly between side guides 317 and an end guide 318, and as the wrapper is moved upwardly the projecting top flap of the wrapper 319 is folded downwardly by the edge of the top plate 320 so that it engages with the end flap 321 which is the flap folded by the folder 308. The overlapping flaps 319 and 321 are held in position during the continued upward movement of the pusher 315 by the guide 318, and spring elements 322 which are attached by their lower ends to the guide 318.

The pushers 315 carry the closed wrappers to a position at which a band 323, for example a revenue stamp, is placed about the wrapper and secured thereto, thereby holding the closure flaps 295, 296, 319 and 321 in position.

The bands 323 are contained in a magazine 324 and are removed from the bottom of the pile contained in the magazine by a suction tube 325 supported by a carrier 326 pivoted at 327. The carrier 326 is caused to oscillate about its pivot by a link 328 connected with one arm of the bell crank lever 329, the other arm of the bell crank lever supporting a cam follower 330 which cooperates with a cam 331. The suction tube draws the band downwardly into engagement with a roller 332 and secured to the spindle 333 to which the bell crank 329 is secured there is also secured an arm 334, the lower end of which supports a separating element 335 and a roller 336. As the band is moved into engagement with the roller 332 it is also engaged by the roller 336 and due to the fact that the roller 332 is positively rotated the band is fed by the rollers 332 and 336 beneath guides 337 and into engagement with the surface of a further roller 338. The separating element 335 serves to separate the bands should two bands be removed from the pile contained in the magazine so that only the lower band is fed by the suction tube to the roller 332.

The band delivered to the roller 338 is held in position thereon by a gripping element 339 which is operated by a fixed cam 340, and as the band is carried around by the roller 338 lines of adhesive are placed on the band by an adhesive applying roller 341 which is rotatable in an adhesive containing bath 342. A scraper or doctor 343 is provided to remove surplus adhesive from the roller 341.

After the adhesive has been applied to the band continued movement of the roller 338 causes the band to be placed in engagement with the closure fold 319 of a wrapper in a manner such that the band projects beyond each broad side of the wrapper. The leading projecting portion of the band engages with the curved surface 344 of a folder 345, and the curved surface 344 causes the leading portion of the band to be folded into engagement with the front broad face of the wrapper being forwarded by the pusher 315. The folder 345 which is carried by a support 346 pivoted at 347 to the machine is caused to lift out of the path of the wrapper being rotated about its pivot by a cam follower 348 supported by an arm 349, the cam follower 348 being operated by a cam 350. The folder 345 is lowered behind the wrapper and engages with the trailing end of the band, folding the said trailing end into engagement with the rear broad side of the wrapper. The wrapper is now completed and is deposited by the pusher piece 315 in a stacker or magazine 351, the pusher being tripped backwardly out of engagement with the wrapper in known manner.

If desired, the bar 352 which is arranged to engage the bands may be heated to facilitate the drying of the adhesive which secures the band in position.

The machine described above is primarily intended for packing cigarettes in cases where compression of the batch is desired prior to its enclosure in the wrapper, but in some cases this compression may not be regarded as necessary. In such cases round cigarettes may be wrapped in batches of comparatively loose form or the cigarettes may be so shaped during manufacture that they nest together much more closely than round cigarettes. If, for example, the cigarettes are made substantially square in cross-section they may be packed without compression and yet the finished packet will be of similar dimensions to that made in the above described machine and contain the same number of cigarettes of the same unit weight. Further, it will be appreciated that the result of compression is to cause the cigarettes to become flat sided to some extent and in fact they assume a more or less square cross-section.

If, therefore, square cigarettes are formed into a comparatively compact batch and wrapped up, the resulting article will be as regards size, appearance and contents, almost identical with the product of the machine previously described and the necessary modifications to the machine for operating without compression will now be described with reference to Figures 31 to 34.

The empty wrappers are formed on the mandrels and delivered to the bands 186 in the manner above described, but in the modified apparatus the bands 186, 189 are arranged to deliver the empty wrappers one by one on to a machine bed where conveyors carry batches of cigarettes in succession through a mouthpiece into the empty wrappers which are carried away from the filling position by continued movement of the conveyors. The open mouths of the wrappers are then folded in a manner similar to that previously described and the packets pass into the apparatus for applying the bands or revenue stamps.

Referring to Figures 31 to 34 cigarettes 360 which are of square cross section are delivered in three rows from hoppers or from a cigarette making machine on to a travelling band 361. The cigarettes in each row are controlled by side guides 362 and top guides 363 and electrical detectors or the like (not shown) may be provided to detect the failure of supply to any of the rows. Should the supply fail, the detectors may operate to stop the machine by stopping the driving motor or declutching the drive in any suitable manner.

The travelling band 361 is arranged at a higher level than that of the machine bed 364, see Figure 34, and discharges the cigarettes on to plates 365, 366 and 367. Plate 365 slopes downwards to the bed level, while plate 366 slopes downwards from the band 361 for a short distance and then becomes horizontal. The arrangement is such that the cigarettes passing over plate 365 are delivered on to the surface of the bed while the horizontal portion of plate 366 is sufficiently high above the bed to allow the cigarettes deposited on the bed to pass beneath it. The plate 367 is horizontal and substantially flush with the level of the band 361 and is sufficiently high to allow the cigarettes on plate 366 to pass beneath it.

The travelling band 361 urges the rows of cigarettes towards the far side of the bed until they are arrested by guides 368, 369 and 470 respectively. The guide 369 projects forwardly of 368 and 470 in order to stop the middle row of cigarettes at an earlier stage so that the batch, which is formed by assembling several cigarettes from each of the three rows carried by the band 361, shall itself comprise three layers and shall contain 6 cigarettes in the middle layer, the upper and lower layers having 7 cigarettes. During transit across the plates 365, 366 and 367 the cigarettes are controlled by top plates 471. As previously stated, the band 361 constantly urges the rows of cigarettes, but in order to assist the movement across the three plates and to ensure that a proper number of cigarettes is gathered, as described later, rotating segmental brushes 472 are provided which engage the upper surfaces of the cigarettes and move them over the plates. These brushes are shown in full in Figure 34, and as chain lines in Figures 31 and 32 for clearness. The side guides 362 project beyond the band 361 towards the middle of the bed 364 as shown in Figures 31 and 34 to control the cigarettes as far as possible until they are in the correct position with respect to the conveyor, and as may be seen from Figure 34, two pairs of these guides are bent downwards to lie parallel with the slopes of plates 365 and 366. Two of the top plates 471 are similarly bent down to lie parallel with the two plates mentioned.

From the foregoing it will be seen that when the machine is working the rows of cigarettes are urged forwardly until the leading cigarettes of each row contact with the guides 368, 369 and 470 and the cigarettes of each row are in lateral contact.

The travelling band 361 is driven by a chain 473 which connects sprockets 474, mounted on the spindle of the outer band roller and sprocket 475 which is fixed to the mainshaft 476 of the machine. The segmental brushes are fixed on a spindle 477 which carries a bevel gear 478 engaging another bevel 379. A sprocket 380 is attached to gear 379 and is driven by a chain 481 from another sprocket 482. The latter sprocket is mounted on a spindle 483 which also carries a sprocket 384 which is driven by a chain 385 from a sprocket 386 mounted on a cross shaft 387.

The bed 364 of the machine has a slot 389 along which the stems of pusher pieces 390 travel, the pushers being carried on spindles 391 connected to two endless chains in the well known manner. The chains are carried by sprockets at each end of the machine bed, the sprockets being fixed to spindles 392 and 393. The pushers are slotted as clearly shown in Figure 31 and the slots are so positioned that when the pushers travel along the bed the slots are level with plates 366 and 367. These plates comprise two parts with a slot between them corresponding to the bed slot and thus the pushers are able to pass between the plates and gather a layer of cigarettes from the bed surface and another layer from each plate 366 and 367 so that when the pusher passes beyond the cigarette feed the three layers are superimposed and form a complete batch.

In order to prevent the cigarettes which are lying in the track of the pusher from rising up owing to the pressure of the remainder of the cigarettes of the rows, levelling devices are provided. These consist of two pivoted plates 394 and a fixed plate 395. Plates 394 are pivoted, as when the pusher engages the row beneath each leveller, the latter must swing upwards to allow the upper portion of the pusher to pass by.

It will be appreciated that as the pusher moves across the rows and carries away a number of cigarettes the rows would move forward as the pusher passes out of the way, and thus the cigarettes might easily get askew. To prevent this pivoted brushes 595 are provided and have bristles which are inclined towards the cigarettes, the angle of inclination being opposed to the direction of movement of the cigarettes. The brushes are lowered on to the surfaces of the cigarettes immediately beyond the pusher track and after a pusher has passed beyond the cigarette feed these brushes rise and the rows move forward to the guide plates. The brushes are pivoted on a spindle 396 and raised and lowered by cams 397 on a spindle 398. The spindle 398 carries a sprocket 399 driven by chain 400 from another sprocket 401. The latter is mounted on a shaft 402 which has a bevel gear 403 fixed on it, the gear engaging another 404 on the conveyor shaft 392. Each pusher conveys a batch of cigarettes along the bed between guides 405. These have inner ribs 406 which engage the middle row of cigarettes and centralise it between the upper and lower rows and a pivoted leveller 407 is mounted on the top plate 408 of the guides. The leveller engages the leading ends of a cigarette batch and pushes back any cigarettes in advance of the rest of the batch while the guides 405 and plate 408, together with the bed surface form a tunnel of rectangular cross-section which squares up the batch to the proper shape and size. The batch then passes through a mouthpiece 409 which is similar to that described and shown with reference to Figure 17.

The preformed wrappers are delivered from the mandrel carrier by the bands 186 as in the previous case and guides 189 are also provided, but in the present construction the bands and guides slope downwards towards the bed 364, see Figure 33. The spring bands 192 co-operate with a single lower spring band 410 and together move the empty wrappers to a position above the guides 411 which are in line with the guides 405. Normally there is one wrapper on the bed between the guides 411 and the next one is delivered on top of it by the spring bands. Continued movement of pusher 390 carries a batch through the mouthpiece, which is mechanically operated as described below, and into the empty wrapper and resulting filled wrapper is carried away. This permits a fresh empty wrapper to drop to the bed level, but to ensure proper location of the wrapper a plunger 412 engages its upper surface and pushes the wrapper down on to the bed.

The plunger has an upright 413 which forms a stop to locate the oncoming empty wrappers. The plunger 412 is fixed to a reciprocating rod 414 which moves in a guide 415. A cam 416 on mainshaft engages a roller 417 attached to the rod 414 and lifts the latter at the proper times, a spring 418 returning the rod to the lower position.

In order to cause the mouthpiece to enter an empty wrapper when the pusher conveys the batch through the mouthpiece the mouthpiece is fixed to a travelling carriage. This comprises a bar 419 having a roller 420 at one end which runs in a fixed guide 421. The other end of the bar travels on a fixed rod 422 and has a slot 423 in it in which runs a roller 424 mounted on a lever 425. Lever 425 is pivoted at 426 and carries a roller 427 engaging a cam 428 on cross shaft 387. The oscillation of lever 425 thus moves the mouthpiece carriage to and fro, the return motion being by spring 429.

During the filling of an empty wrapper the latter is held in position by a back stop 430 pivoted at 431 to a fixed bar 432. The back stop has a small groove in it and a pivoted roller 433 is normally situated in this groove. Immediately the cigarettes are in the proper position inside the wrapper the pressure of the pusher causes the back stop to turn on is pivot and the roller 433 is forced out of the groove, thus permitting the back stop to swing upwards and let the filled wrapper and pusher pass beneath it. The pivoted roller is urged downwards by a spring 434 and as soon as the pusher has passed the spring causes roller and backstop to move back to the position shown in Figure 32. The filled wrapper is next conveyed into the mechanism for folding or tucking the flaps of the open end of the wrapper. This is identical with that previously described and shown, for example, in Figure 5, except for the method of operating the bottom tucker or folding element. In the present instance this element 435 is pivoted and operated by a cam 436 and spring 437, see Figure 32. The cam is mounted on a cross spindle 438 driven by a chain 439 from conveyor spindle 393.

By comparing Figures 1 and 31 it will be seen that the section of the machine just described is located to the right of the wrapper former (Figure 1) and takes the place of the mechanism shown in that position on Figure 1. The section just described is driven from the wrapper forming section. The gear 540, Figure 31, is fixed on a cross shaft 541, Figure 32, which carries a bevel wheel 442 engaging another 443 on the mainshaft 376. The various drives from the mainshaft may be seen by inspection of Figure 32.

What we claim as our invention and desire to secure by Letters Patent is:

1. In a machine for wrapping cigarettes, a mandrel support mounted for rotation in a vertical plane, a mandrel extending lengthwise from said support in a direction substantially parallel with the axis of rotation of the support means to form pouch-shaped wrappers open at one end about said mandrel, an intermittently rotatable carrier having peripheral pockets each to receive a formed, empty wrapper, a conveyor to deliver formed, empty wrappers from said mandrel to said pockets, means to compact batches of cigarettes transversely to the length of the cigarettes, means to insert a compacted batch of cigarettes into a wrapper positioned in one of said pockets and means to close the open end of the wrapper.

2. In a machine for wrapping cigarettes, a mandrel support mounted for rotation in a vertical plane, a mandrel extending lengthwise from said support in a direction substantially parallel with the axis of rotation of the support means to form pouch-shaped wrappers open at one end about said mandrel, each of said wrappers comprising an inner and an outer wrapper, the inner of said wrappers extending beyond the open end of the outer wrapper to provide material for closing the wrapper, an intermittently rotatable carrier having peripheral pockets each to receive a formed, empty wrapper, a conveyor to deliver formed, empty wrappers from said mandrel to said pockets, means to compact said batches of cigarettes transversely to the length of the cigarettes, means to insert a compacted batch of cigarettes into a wrapper positioned in one of said pockets, means to close the open end of the wrapper and means to secure a band about the closed end of the wrapper.

3. In a machine for wrapping cigarettes, a mandrel support mounted for rotation in a vertical plane, a mandrel extending lengthwise from said support in a direction substantially parallel with the axis of rotation of the support means to form pouch shaped wrappers open at one end about said mandrel, an intermittently rotatable carrier having peripheral pockets each to receive a formed, empty wrapper, a conveyor to deliver formed, empty wrappers from said mandrel to said pockets, an intermittently rotatable compacting device co-axial with said rotatable carrier and movable in timed relationship therewith to compact batches of cigarettes transversely to the length of the cigarettes, means to insert a compacted batch of cigarettes into a wrapper positioned in one of said pockets and means to close the open end of the wrapper.

4. In a wrapping machine, a movable carrier having pockets to receive preformed wrappers for filling, a conveyor to deliver a wrapper to a position above a pocket, a plunger to engage the upper surface of a wrapper and to insert the wrapper into a pocket, an abutment projecting downwardly from the wrapper engaging surface of the plunger, and a member supporting said plunger and arranged to provide a stop to prevent substantial movement of the wrapper in the direction of filling thereof, said member being supported for movement by a parallel linkage device.

5. In a machine for wrapping cigarettes, a pair of co-axial rotatable members each provided with pockets, the pockets of one of said members being arranged to receive empty preformed wrappers, means associated with the pockets of the other rotatable member to compact batches of cigarettes inserted into such pockets and means operative when a compacted batch of cigarettes and the open end of an empty wrapper are in alignment to insert the batch of cigarettes into the empty wrapper.

6. In a wrapping machine, a member mounted for intermittent rotation in a vertical plane and having a peripheral pocket to receive an empty, preformed wrapper, a support for wrappers to be introduced into said pocket, said support being located in a position adjacent to the top position of said pocket, means to move a wrapper from said support to a position directly above the top position of the pocket, a plunger movable in timed relationship with said member to position a wrapper in said pocket, and a wrapper locating device operative in timed relationship with said plunger to be moved into and out of the path of wrappers being moved from said support.

7. In a wrapping machine, a member mounted for intermittent rotation in a vertical plane and having a peripheral pocket to receive an empty, preformed wrapper, a support for wrappers to be introduced into said pocket, said support being located in a position adjacent to the top position of said pocket, means to move a wrapper from said support to a position directly above the top position of the pocket, a plunger movable in timed relationship with said member to position a wrapper in said pocket, and an abutment projecting downwardly from said plunger to determine the extent of movement of a wrapper being moved from said support.

8. In a wrapping machine, a member mounted for intermittent rotation in a vertical plane and having a peripheral pocket to receive an empty, preformed wrapper, a support for wrappers to be introduced into said pocket, said support being located in a position adjacent to the top position of said pocket means to move a wrapper from said support to a position directly above the top position of the pocket, a plunger movable in timed relationship with said member to position a wrapper in said pocket and two abutments connected with the plunger for movement therewith, one of said abutments projecting downwardly from said plunger to determine the extent of movement of a wrapper being moved from said support, said other abutment extending upwardly from the plunger to prevent a wrapper from being moved from the support when the plunger is between its lowest and highest positions.

9. In a wrapping machine, a member mounted for intermittent rotation in a vertical plane and having a peripheral pocket to receive an empty, preformed wrapper, those ends of said pocket which are located in planes parallel to said vertical plane being open, a support for wrappers to be introduced into said pocket, said support being located in a position adjacent to the top position of said pocket, means to move a wrapper from said support to a position directly above the top position of the pocket, a plunger movable in timed relationship with said member to position a wrapper in said pocket, means to insert an article into a wrapper positioned in said pocket, and an element movable in timed relationship with said plunger and in a path adjacent to that open end of said pocket which is opposite the end thereof from which an article is inserted into a wrapper, to prevent substantial movement of a wrapper in the direction in which an article is inserted thereinto.

10. In a wrapping machine, a member mounted for intermittent rotation in a vertical plane and having a plurality of spaced peripheral pockets each to receive an empty, preformed wrapper, each of said pockets having a bottom wall, and a fixed and a movable side wall which are opposed to each other and which are substantially parallel to the axis of rotation of said member, the bottom wall of a pocket being connected with the top of the fixed wall of the next preceding pocket, considered in the direction of rotation of said member, by a gradually sloping portion of the periphery of said member, means operative in timed relationship with the movements of said member to move said movable side wall through an aperture in said bottom wall to locate the movable side wall below the bottom wall, a support for wrappers to be introduced into said pockets, means to move a wrapper from said support on to a gradually sloping peripheral portion, and a plunger movable in timed relationship with said member to retain a wrapper in position on said sloping portion during relative movement between said member and the wrapper resting on said sloping portion.

11. In a wrapping machine, an endless conveyor to advance formed, empty wrappers towards a filling position, an abutment adjacent the path of wrappers supported by said conveyor to locate the ends of such wrappers, and an endless movable surface inclined to the direction of movement of said conveyor and disposed above said conveyor by a distance such that wrappers supported by the conveyor are moved towards said abutment.

12. In a wrapping machine, an endless conveyor to advance formed, empty wrappers towards a filling position, an abutment adjacent the path of wrappers supported by said conveyor to locate the ends of such wrappers, and a pair of movable side by side spring bands inclined to the direction of movement of said conveyor and disposed above said conveyor by a distance such that wrappers supported by said conveyor are moved towards said abutment.

13. In a wrapping machine, a support for a preformed, empty wrapper, a source of supply for articles to be wrapped, means movable between said source and support to insert an article into a wrapper, a member movable between said source and support and in timed relationship with said means, a pair of carriers pivoted to said member for movement therewith, a pair of guide elements pivoted to each carrier, the guide elements of each pair being disposed one above the other about pivotal axes located in substantially parallel planes which are substantially normal to the planes of the pivotal axes of the carriers, and means resiliently to urge the guide elements of each pair towards each other and to urge each pair of guide elements towards the other pair.

14. In a wrapping machine, a wrapper support for a preformed, empty wrapper, a source of supply for articles to be wrapped, means movable between said source and wrapper support to insert an article into a wrapper, a carrier support, a parallel linkage mechanism connected with the carrier support, means to operate the parallel linkage mechanism in timed relationship with said first named means and to move the carrier support between said source and wrapper support, a pair of carriers pivoted to the carrier support for movement therewith, a pair of guide elements pivoted to each carrier, the guide elements of each pair being disposed one above the other about pivotal axes located in substantially parallel planes which are substantially normal to the planes of the pivotal axes of the carriers, and means resiliently to urge the guide elements of each pair towards each other and to urge each pair of guide elements towards the other pair.

15. In a wrapping machine, a wrapper support for a preformed, empty wrapper, a source of supply for articles to be wrapped, means movable between said source and wrapper support to insert an article into a wrapper, a carrier support movable between said source and wrapper support and in timed relationship with said means, a pair of carriers pivoted to the carrier support for movement therewith, a pair of guide elements pivoted to each carrier, the guide elements of each pair being disposed one above the other about pivotal axes located in substantially parallel planes which are substantially normal to the planes of the pivotal axes of the carriers, each of said guide elements comprising a continuous surface bent in two planes for simultaneous engagement with two adjoining sides of a wrapper, and means resiliently to urge the guide elements of each pair towards each other and to urge each pair of guide elements towards the other pair.

16. In a wrapping machine, a support for a preformed, empty wrapper having curved corners, a source of supply for articles to be wrapped, means movable between said source and support to insert into a wrapper an article taken from said source, a pair of carriers pivoted to said member for movement therewith, a pair of guide elements pivoted to each carrier, each guide element including portions to engage adjoining inner sides of a wrapper, and the curved corner connecting such sides, the elements of each pair being disposed one above the other about pivotal axes located in substantially parallel planes which are substantially normal to the planes of the pivotal axes of the carriers, and means resiliently to urge the guide elements of each pair towards each other and to urge each pair of guide elements towards the other pair.

JOHN WALKER CHALMERS.
DAVID BLEWES KIDD.